United States Patent [19]
Aytac

[11] Patent Number: 5,758,081
[45] Date of Patent: May 26, 1998

[54] COMPUTING AND COMMUNICATIONS TRANSMITTING, RECEIVING SYSTEM, WITH A PUSH BUTTON INTERFACE, THAT IS CONTINOUSLY ON, THAT PAIRS UP WITH A PERSONAL COMPUTER AND CARRIES OUT MAINLY COMMUNICATIONS RELATED ROUTINE TASKS

[76] Inventor: Haluk M. Aytac, 10270 Parkwood Dr. 8, Cupertino, Calif. 95014

[21] Appl. No.: 569,846

[22] Filed: Dec. 8, 1995

[51] Int. Cl.⁶ .................................................. G06F 1/32
[52] U.S. Cl. ........................... 395/200.41; 395/821
[58] Field of Search ............................... 395/871, 474, 395/200.01, 200.05, 281, 306, 309, 802, 892, 882, 285, 500, 200.41; 345/156

[56] References Cited

U.S. PATENT DOCUMENTS

| | | | |
|---|---|---|---|
| 4,688,171 | 8/1987 | Selim et al. | 395/200.02 |
| 4,839,802 | 6/1989 | Wonak et al. | 395/834 |
| 4,878,196 | 10/1989 | Rose | 395/750 |
| 4,974,192 | 11/1990 | Face et al. | 395/821 |
| 4,982,324 | 1/1991 | McConaughy et al. | 395/200.09 |
| 4,994,963 | 2/1991 | Rorden et al. | 395/309 |
| 5,239,632 | 8/1993 | Larner | 395/306 |
| 5,361,134 | 11/1994 | Hu et al. | 358/296 |
| 5,367,647 | 11/1994 | Coulson et al. | 395/285 |
| 5,530,894 | 6/1996 | Farrell et al. | 395/800 |
| 5,577,205 | 11/1996 | Hwang et al. | 395/200.01 |
| 5,590,339 | 12/1996 | Chang | 395/838 |

OTHER PUBLICATIONS

AT & T Computer Telephone 8130.
Zyxel Elite 2864 Modem.
IBM Seho Assistant, 7852001.
Brooktrout Quadrafax 2.0 Fax on Demand System.
Conon Multipass 1000 Multifunction Peripheral.
Lumina Series 2000 Multifunction Peripheral w/o Printer.
Pacific Image Electronics Scon Media Multifunction Peripheral without a Printer.

*Primary Examiner*—Dinh C. Dung

[57] ABSTRACT

An embedded computer, CaTbox, is connected to a PC via SCSI cable, and to a telecommunications switch. CaTbox runs an operating system, CaTOS, and contains a hard disk accessible to PC as a SCSI disk called CaTdisc. Print jobs issued from PC are transferred as files to CaTdisc, queued by CaTOS and driven in the foreground to a printer attached to CaTbox. CaTbox has an LCD screen, keypad, and is connected to telephone handsets. While PC and printer are off, CaTbox receives faxes, voicemail, email and stores them on CaTdisc. It delivers HTML pages stored on CaTdisc. Keypad directed, CaTbox plays voicemail and prints faxes or email. Modems on CaTbox, CaTmodems, are available for data, voice, fax communications from PC. A scanner on SCSI bus may be driven by CaTbox via keypad to scan documents to store on CaTdisc, print or send as faxes. CaTOS has step tables for each modem, actions, foreground programs, configuration files, and queues. Steps hold actions that execute within a time slice for a modem during timer tick. Actions emit, record messages, queue foreground program requests, queue requests for another step, call other actions, idle, answer a call etc. Steppers within each time slice move execution from step to step based on keypad inputs, events, conditions, and contents of step tables. Foreground programs move files to, from memory, print, scan etc. Idle actions check a queue for steps to execute. A scheduler runs after timer ticks to choose the next foreground program.

14 Claims, 16 Drawing Sheets

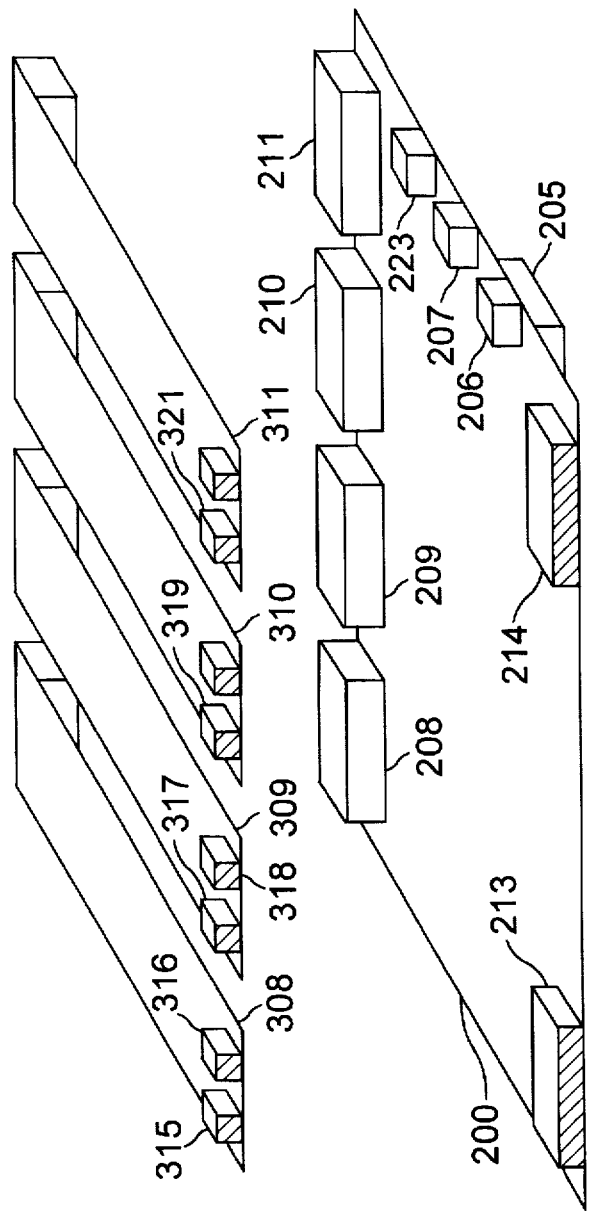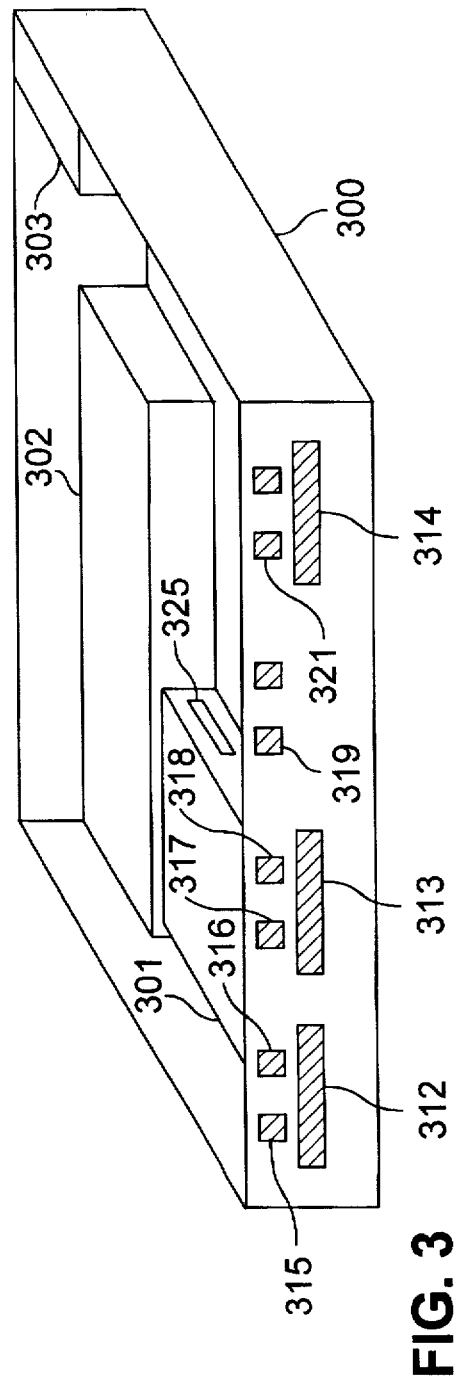
FIG. 3

```
;*******************************************
;*       BUILD FAXBACK DATA BASE           *
;*******************************************
; BUILD FAXBACK DATA BASE (1)
acd_bdfbx_get_doc_no    dw      ST_ANNOUNCE_AND_COLLECT_DIGITS
                        dw      JUMP_UNCOND
step_0046_next_step     dw      0047h                           ; if all goes well
                        dw      0000h                           ; tmo, no dtmf, timeout etc
                        dw      0000h                           ; tmo for in coming fax
                        dw      0046h                           ; * goto emit_doc_list
                        dw      0000h                           ; # and non NULL doc no
                        dw      0000h                           ; # and NULL doc no
step_0046_parameters    dw      DO_NOT_EXPECT_DTMF
                        dw      vcon_session_filename_H
                        dw      ACD_GET_FAXBACK_DOC_NUMBER
                        dw      vcon_session_repeat_count
                        dw      DO_NOT_STOP_ON_DLE
                        dw      vcon_session_faxback_doc_number
                        dw      LCD_MESSAGE_YES
                        db      "please enter faxback"
                        db      "document number and ",00h
                        db      "press #                 ",00h
                        db      "thank you!              ",00h, 00h
```

FIG. 6

```
;******************************************
;*        BUILD FAXBACK DATA BASE         *
;****0046****************************** acd_bdfbx_get_doc_no   dw    ST_ANNOUNCE_AND_COLLECT_DIGITS
                       dw    JUMP_UNCOND
                       dw    step_0046_parameters
step_0046_next_step    dw    0047h                          ; make file name for tcf file
                       dw    0000h                          ; tmo, no dtmf, timeout etc
                       dw    0000h                          ; tmo needs this for incoming fax
                       dw    0046h                          ; * goto emit_doc_list
                       dw    0000h                          ; # and non NULL doc number
                       dw    0000h                          ; # and NULL doc number
step_0046_parameters   dw    DO_NOT_EXPECT_DTMF ; F=0 works
                       dw    vcon_session_filename_H ;FBXBLD.PCM
                       dw    ACD_GET_FAXBACK_DOC_NUMBER
                       dw    vcon_session_repeat_count
                       dw    DO_NOT_STOP_ON_DLE
                       dw    vcon_session_faxback_doc_number
                       dw    LCD_MESSAGE_YES
                       db    "please enter faxback"
                       db    "document number and ",00h
                       db    "press # "
                       db    "thank you!", 00h, 00h
```

FIG. 11A

```
;*****************0047****************************
em_bdfbx_data_base    dw    ST_EMIT_MSG
                      dw    DTMF_ANALYZE
                      dw    step_0047_parameters
step_0047_next_step   dw    0048h
                      dw    0000h                          ; no dtmf, repeat first
                      dw    0000h                          ; dtmf_*
                      dw    0000h                          ; dtmf_# = ttq_req
                      dw    0000h                          ; dtmf_0 =
                      dw    0048h                          ; dtmf_1 = scan to pcx
step_0047_parameters  dw    EXPECT_DTMF
                      dw    vcon_session_filename_7  ; SFXMSG.PCM
                      dw    VCON_SPEAKER
                      dw    DO_NOT_STOP_ON_DLE
                      dw    LCD_MESSAGE_YES
                      db    "place page to fax on"
                      db    "scanner and press 1 ",00h
                      db    "press # if no more ", 00h, 00h
                      db    "pages to scan
```

FIG. 11B

```
;*****************0048*************************
sp_bdfbx_sctopcx    dw    ST_START_PROGRAM
                    dw    JUMP_UNCOND              ; flags register for this step
                    dw    step_0048_parameters
step_0048_next_step dw    0049h
                    dw    0000h                    ; in case scanner is off etc.
step_0048_parameters dw   DO_NOT_EXPECT_DTMF + SP_PARAM_2_SEG
                    dw    vcon_session_constant_7  ; SCTOPCX.EXE
                    dd    00000000h                ;argument_1 not used
                    dw    vcon_session_fax_filename ;argument_2 SEG:OFF
                    dw    step_table_seg_number    ; of fn to be returned by
                    dw    WAIT_TO_COMPLETE         ; sctopcx.exe (FS)
                    dw    LCD_MESSAGE_NO           ; no LCD message
```

FIG. 11C

```
;************0049************
sp_bdfbx_incbdfbx    dw   ST_START_PROGRAM
                     dw   JUMP_UNCOND         ; flags register for this step
                     dw   step_0049_parameters
                     dw   0047h               ;
                     dw   0000h               ; in case scanner is off etc.
                     dw   DO_NOT_EXPECT_DTMF + SP_PARAM_2_SEG
step_0049_next_step  dw   vcon_session_constant_L   ; BLDFBXDB.EXE
                     dw   vcon_session_faxback_doc_number ; argument_1
step_0049_parameters dw   step_table_seg_number
                     dw   vcon_session_fax_filename ; argument_2 SEG:OFF
                     dw   step_table_seg_number     ; of fn to be returned by
                     dw   WAIT_TO_COMPLETE          ; sctopcx.exe (FS).
                     dw   LCD_MESSAGE_NO
```

FIG. 11D

COMPUTING AND COMMUNICATIONS TRANSMITTING, RECEIVING SYSTEM, WITH A PUSH BUTTON INTERFACE, THAT IS CONTINOUSLY ON, THAT PAIRS UP WITH A PERSONAL COMPUTER AND CARRIES OUT MAINLY COMMUNICATIONS RELATED ROUTINE TASKS

FIELD OF THE INVENTION

The present invention relates generally to communications via electronic means using computers, and particularly, to methods and apparatus which implement telephony, voice reception, storage, playback, delivery, fax reception, printing, storage, delivery, call processing, electronic mail retrieval, multimedia content delivery, HTTP server functions in a standaside fashion in relation to computers.

BACKGROUND OF THE INVENTION

The present invention relates to a splitting of the Personal Computer in two units one of which may be the PC as is known today, including portable computers, and the other is described with this invention.

There are earlier models for this idea: The TV is paired with a VCR; the radio is paired with a tape recorder; the telephone is paired with an answering machine. In all these cases, a real time device is paired with a storage device.

The TV and radio are respectively video/sound and sound real time broadcast receivers. The VCR is used to record TV signals when TV is either off or on. One reason why TV and VCR are split maybe the disparity in power consumption. Consumers may leave their VCR operating while they are away, to record desired programs. VCR's do not consume much power. On the other hand, TV consumes more power, generates heat. Splitting the real time from the storage device, different power supplies may be employed so that VCR may be left on while TV is off.

Radio and tape recorder are typically only when the user is present. Sometimes these devices are split, sometimes they are housed in the same box. In all cases, they are separately operated, as in TV/VCR, with different sets of push buttons guiding each unit.

The phone and the answering machine are sometimes housed in the same box and sometimes in separate boxes. The advantage of separate boxes is enabling the user to receive a phone call while he is listening to his messages. The phone and the answering machine are always on. The phone is powered from the Central Office and the answering machine is powered locally.

The computer, being a programmable device, can mimic the functions of all the devices described above and more. Indeed, all these functions have already been implemented inside a computer, especially personal computers (we will include portable computers with personal computers and sometimes call them PC's). Unfortunately, with the flexibility also comes complexity.

The preferred way to choose functions on a TV/VCR, phone/answering machine, and radio/tape recorder is via push buttons each of which denotes a fixed function. The computer, being far more flexible and this flexibility being made available to the user, works with a keyboard which can receive commands in the user's language. The keyboard allows a virtually unlimited number of commands. Graphical User Interfaces, on the other hand, coupled with pointing devices, create a push button type model on the monitor screen although more tedious to use than a push button interface on a telephone or fax machine.

The immense popularity of the Personal Computer AT brought about a large peripherals industry. The varieties of functions that are possible and attractive are straining the capabilities of the PC/AT. Internal attachments to the PC/AT bus that perform fax, voice mail, electronic mail functions are available.

Users of personal computers are having to stretch their intellectual capabilities installing hardware and software. In the words of PC Magazine editor, Michael J. Miller, "Setting up hardware so it works with all your software, and vice versa, is ridiculously complicated on the PC." (PC Magazine, Mar. 14, 1995, p. 79) Graphical user interfaces (GUI) have brought some order on the desktop but have not quite solved the limitations of the hardware and the difficulties of multiple pieces of software all working together. A spot check of user mail to Compuserve forums for Windows 95 GUI based operating system on Aug. 28, 1995 showed that COM ports and IRQ (interrupt) problems are very much alive.

Machines that perform fax and voice mail functions independently of a PC have been around for quite some time. The telephone answering machine was already mentioned. The fax machine is connected to the phone line which it may or may not share with a telephone. These machines are easy to use as they are operated with push buttons. They are available to perform around the clock as they do not consume much power. These machines are also able to work with answering machines. If a phone call comes in and it is not a fax, the call is passed on to the answering machine. Some incorporate the answering machine function. A drawback of these machines is lack of long term storage. Accordingly, incoming faxes are stored on paper that is they are printed right away. Usually, there is some RAM in case paper runs out. Some fax machines have connections to a PC. This way the scanner and printer inside a fax machine can be used by the PC. Typically, this is a serial or parallel connection. The reason for this connection is as follows: fax machines originated during the days of the typewriter. A user typed a letter and then inserted it into the fax machine to be sent. With the advent of personal computers, documents were created mostly with word processors on these computers. A need arose to send such documents via fax. Fax cards attached to PC's satisfied this need. If fax machines can be attached to personal computers to let users send faxes from their PC via fax machines then fax cards would not be needed anymore. However, the serial connection is too slow to transfer faxes. The parallel port is fast enough but as there is only one parallel port on a PC, the printers in fax machines have to compete with better quality standalone printers for this port and they often lose. Moreover, fax cards are also data modem cards and users need these cards on the PC to access on-line, email services and the currently very popular Internet. Thus fax machines and fax cards continue to coexist.

There are good reasons for fax and voice mail to become a part of computers. Most owners of PC's also own a printer. The printer on a fax machine duplicates the same function at added cost. Likewise, some owners of PC's also own a scanner. The scanner on a fax machine duplicates the same function at added cost. In addition, as a scanner and printer come bundled with a fax machine, the user does not have the choice to mix and match scanners and printers and usually these scanners and printers are not of a high quality. To realize functionality equivalent to a fax machine a PC owner needs to acquire a modem. Internal or external modems are available. The user can either scan a document or produce one on his PC. He can then send it as a fax via his fax modem. When a fax arrives, he can print it, after viewing it on his PC monitor. In contrast to a standalone fax machine that has to print incoming faxes as they show up, the PC has an internal storage such as hard disk or memory where it can store incoming faxes to be printed later.

Telephone answering machines are hardwired to a specific flow chart that implements voice mail functions. A computer would give the user the capability to change this flow chart and have it work on the same hardware. Moreover, most fax modems are also voice/data modems so that voice capability comes at little added cost.

On the other hand, new problems arise when faxing solely with a PC is attempted. A PC consumes power and aside from those at large businesses, PC's are shut down by users at night. Thus, owners of fax cards on PC/AT's are not able to tell others that they have a telephone number available to receive faxes. Likewise, they need a standalone phone answering machine in addition to their voice mail card if they wish to receive voice mail at night or when they are away.

In addition, from a simple push button user interface of a phone answering machine or a fax machine, the users are invited to switch to operating systems with GUI (graphical user interface) which is tedious for simple tasks. Also, the multiplicity of functions on a PC brings about a complexity that has kept the users largely frustrated as they attempt to add more functions to their machines.

In particular, the number of interrupt inputs is a limitation on the number of functions a PC/AT can accommodate. Users are having to have their peripheral hardware share interrupts with attendant conflicts. In addition, communications protocols are continually increasing their bandwidth. This puts a further strain on multitasking operating systems.

Printing is a slow process. Lately, printing protocols have been enhanced. The standard printing protocol (so called Centronics or SPP as it is now called) is being enhanced to EPP and ECP. A reference for these new protocols is *Standard Signaling Method for a Bi-directional Parallel Peripheral Interface for Personal Computers, IEEE* P1284 D2.00. Most PC's are not now equipped to handle this new protocol. Users who wish to upgrade will have to add yet another card to their already crowded AT bus slots.

Even if users acquire these printing technologies on their PC's, there are limitations to printing speed in the current configuration. As PC's have to be available to users for input, some printing tasks are performed in the background. Once a print file is prepared, it takes time to send it to the printer in the background.

To summarize, there are a number of electronic gadgets that are hovering around a PC but never quite become a part of it. The phone, the answering machine, fax machine, copier are the main examples of these gadgets. None of these have been successfully implemented on a PC in a way that has been accepted in the marketplace. PC has two main drawbacks in this situation:

1. It is not always on
2. It is not push button driven

Each one of these electronic gadgets has processing done at its core. The central processing units may all be different. The programs that run these gadgets are frozen at the factory. In a way this situation is not far different than what we had before the arrival of the PC: each piece of hardware came with its own software. With the arrival of PC the field became open for imagination to reveal itself in software.

There is a similar need for programmability for these gadgets. Any fax hardware is a good site for faxback capability. It is just extra software and storage. Any data modem site can be a World Wide Web delivery site.

OBJECTS AND ADVANTAGES OF THE PRESENT INVENTION

It is therefore desirable to split the routine communications functions apart from a personal computer into a separate embedded computer that is always on and has a push button interface. From here on, we call this separate embedded computer a CaTbox. This name is an allusion to the way this device sits between a Computing and a Telecommunications apparatus. The Computer is the PC, and the Telecommunications apparatus is either the Central Office or some PBX equipment. To give this new device a generic name, we call it Personal Telecommunicator or PT for short. The table below shows how PC and PT serve a user's needs for computing and communicating:

|  | PC | PT |
| --- | --- | --- |
| interface | graphical, mouse, keyboard | push button, LCD |
| availability | off when not being used | always on |
| type of tasks | complex, requires user attention | routine |
| price | expensive | low cost |

Thus, to accomplish a task, a user has two alternatives. If the task is a complex one such as that of writing an electronic mail to someone, he will use the PC. If the task is simple, such as retrieving email he might have at his access provider, he will push a button on the PT. Note that both tasks have to do with communications. He could also retrieve email from his PC. He just has a choice now. If the user wishes to send a fax, he can either send it from his PC or insert the document in the scanner and push buttons. If the user wishes to develop a WEB site on Internet, he can develop the content on his PC and write the files to CaTdisc. The delivery can be done by PT. For faxback, the faxback data base can be built on PT or PC. They both have access to the scanner. Voice mail comes directly to PT and is replayed there. A telephone number can be dialed from PC, from CaTbox PT, a handset, or a receiver that sits on an on hook/off hook cradle.

The relationship between PC and PT can be likened to the conventional oven/microwave oven relationship. To cook complex dishes one can use the conventional oven. For heating a snack for lunch one uses the microwave oven.

CaTbox would look like a hard disk to the PC and it would be attached to it via a cable. The preferred embodiment has CaTbox look like a SCSI disk to the PC. A specification of SCSI is given in X3.131 *SMALL COMPUTER SYSTEMS INTERFACE*-2 REV:10L.

An advantage of this scheme is ability to update CaTbox software via PC, by loading it to CaTdisc. Upon reset, CaTbox would start using the new software. In most cases reset is not necessary. For example making a new voice file on PC and copying it to the file on CaTdisc assumed for a step will make it so next time the modem's step table traverses this step, the new sound will be emitted. A configuration file on CaTdisc links modems to their so called step tables which along with a set of foreground programs define their behavior under inputs. One can edit this file from an editor on PC to reassign step tables to modems. If new editions of CaTbox software becomes available, the user can download it from an Internet location, or receive it in the mail as a floppy disk. The new step tables and foreground programs would then be loaded to CaTdisc either from PC's floppy disk drive or directly from the Internet location. In addition, there may be programs on a PC that help edit and make new step tables. Again, writing these to CaTdisc and editing the configuration file on CaTdisc would create the new behavior on CaTbox. Thus, without changing the hardware, continuous improvements to the usefulness of CaTbox are possible.

CaTbox is then the open, programmable, single site for processing for the answering machine, fax machine, copier, and telephone. This invention takes out the processing core from each one of these gadgets and gives the tasks to a single central processing unit that is the CaTbox. It builds a multitasking operating system on top of DOS for this processing unit that allows for writing programs that implement answering machine, fax, telephony, and other functions such as an HTTP server for World Wide Web delivery. It makes the hard disk for this system available to a PC so that new programs can be downloaded to CaTbox. This downloading is simply a file copy from one disk (for example a floppy disk) to another (CaTdisc).

In the last section, we showed why communications functions cannot be brought into the PC in a way that would be user friendly. But they can be brought into a site next to a PC that is always on and is driven via a push button interface. So the answer to computer telephony integration is: a PC/PT pair.

The presence of a CaTbox would free the PC's parallel port, serial ports and its internal hardware interrupt lines. Thus, the PC can potentially become a simpler machine.

CaTbox would free the PC's Graphical User Interface from chores of printing and scanning faxes and receiving voice mail on the PC. These tasks take quite a bit of time now and as they execute, they occupy the PC's user interface and preoccupy the user's mind.

CaTbox would utilize printers and scanners currently attached to PC's. It would have a printer attached to it and it would receive printing requests from the PC along with its own internal requests and implement them both with faster printing protocols that the printer may respond to. It would receive the print files from PC as block transfers as opposed to character transfers. These files would be transferred to a special directory on the CaTdisc (the term we use to emphasize that CaTbox has a hard disk that looks like a SCSI disk to the PC). During the transfer, the directory path would be detected, the file name would be changed and this new file name would be put on a print queue. A print routine inside the CaTbox would periodically check this queue and would print any files found therein. As the CaTbox need not be available to users for input via keyboard and mouse, its foreground is available for tasks such as printing. The combination of block transfer of print files to CaTdisc and foreground printing allows considerable speedup of the printing process.

CaTbox would be independent of PC in terms of power supply; it would consume low power so that it can be left on while the PC is preferred to be off when not in use. The PC may even be a portable one that the user takes with him. The PC may not even have a hard disk: it could use the CaTdisc as a hard disk. CaTbox stays put to receive voice, fax, and email messages.

It is desirable that in the CaTbox, the sequence of functions implementing answering machine, voice mail, copy, faxback and other functions be described in a separate file from the program that steps through the sequences and executes them. This way, the file describing the sequencing could be changed without changing the program that executes it. Armed with a program that helps to create such a sequencing file, a user would be able to change the sequencing of functions on location. This way, one could create a faxback application, a voice mail application, a combination thereof, etc. Once such a file was created on the user's PC, it would be very easy to download it to CaTbox as it is also a CaTdisc i.e. a SCSI disk to PC. In addition, the user may need to create DOS programs to implement applications. Once created on host PC, these programs would be written to special directories on CaTdisc, to be utilized by the sequencing files.

The modem(s) on the CaTbox would, upon detecting a RING, answer the phone, distinguish between voice, fax, data and act accordingly. These modems may also be cable TV modems instead of telephone modems.

CaTbox equipped with an ATA (IDE) hard disk (CaTdisc), would hold faxes and voice mail until the user wished to print or hear them. Just as the CaTbox shares the scanner with the PC, this hard disk could also be shared between these two computers. CaTdisc would look like a SCSI hard disk to the PC. The price of hard disks does not scale down linearly as capacity decreases when such capacity is of the order of what would be needed to store a normal load of faxes and voice mail. A larger hard disk that the PC could also use would be an economical way of sharing costs between the PC and the CaTbox. In some cases, users might wish to replace their current ATA (IDE) hard disks inside their PC with disks of higher capacity. Then, a CaTbox sold without a hard disk would provide a home for the old ATA hard disk that otherwise would sit idle in storage. It is also possible to use a SCSI disk in place of the ATA disk.

A CaTbox endowed with a keypad and an LCD would also be easier to use. Its interface would approximate that of the telephone or the standalone fax machine instead of the Graphical User Interfaces that are more complex and slow. Accessing the functions of the CaTbox would be achieved with the same interface on the keypad, on the handset, and from a remote handset.

CaTbox would make a separate fax machine and an answering machine unnecessary. If desired, it would also make a separate handset unnecessary.

A CaTbox that was an embedded PC could use the hardware and software that is available for PC's. CaTbox would be closed to expansion by the user so that its hardware and software were known to interact properly prior to sale to the user. The property of being closed to expansion by the user would also make it possible to set the speed of the internal busses to be the maximum possible speed determined at the factory. In particular, the AT bus could be run at higher speeds than the standard 8 MHz. The exception to expansion limitations would be changing the number of modems and changing the step tables that drive these modems. For example, one could change a modem from performing answering machine/fax machine tasks to faxback related tasks.

A host PC user program that implements fax functions via the CAS interface can still be used with the PC/CaT pair. Such programs usually talk to a TSR via INT 2Fh, AH=CBh calls. These calls are translated to SCSI calls via other LUNs (logical unit number) than the ones used to implement CaTdisc. At the CaTbox, this SCSI call now causes an INT 2Fh, AH=CBh call to the CAS TSR which implements the call via the modem on the CaTbox. Note that there is no modem or TSR on the host PC. An advantage of this scheme is to free memory on the host PC that the TSR would occupy. This is one of the main reasons why fax software vendors are getting away from CAS as it ties up too much memory sometimes causing loss of mouse use. Another advantage of this method is not using a hardware interrupt on the PC. Hardware interrupts (IRQ's) for communications ports (COM ports) are at a premium.

Now that the modem is no longer on the PC but on the CaTbox (CaTmodem), the user may still wish to access this modem as a data/fax/voice modem and as if it is on the host PC. This is implemented using yet other LUN's than the ones used for CaTdisc and CAS translation. An advantage of this approach is that CaTmodem does not require use of irq (hardware interrupts) dedicated to COM ports on the PC. This is a tremendous advantage as there are only 2 irq's allocated to the 4 COM ports. In some PC's, one irq is used by the mouse and another by the graphics chip. This makes for irq conflicts and causes users endless frustration.

Multiple modems may be installed on the CaTbox. This way, CaTbox may be used as a multiline faxback system, or, multiple host PC communications tasks may be run simultaneously each without a hardware interrupt on the host PC, or, CaTbox may be used as a multiline telephone/answering machine system. Each line may be configured differently by editing a configuration file on CaTdisc from PC, and changing the assignment of a step table file name to a modem. Thus, line A can be for voice/fax, line B can be for faxback call processing and delivery and line C can be for HTTP server for World Wide Web site HTML page delivery while each modem is still available for faxing and other modem transactions initiated at PC such as phone dialing.

Driven by the keypad, CaTbox may scan a document on the scanner and print it to the printer, thereby achieving the copy function. This copy function would be faster than one available on PC as the printing will be done in the foreground by CaTbox.

Driven by the keypad, CaTbox may dial a number, make a connection and the user may then either start a conversation via microphone/speaker or handset, or a receiver. CaTbox, may thus act like a telephone.

CaTbox, while implementing the functions expected from a fax machine, would be detached from a printer and a scanner so that a user may purchase scanners and printers separately from a CaTbox enabling him wider choice in which types of scanners and printers to buy.

The analogy here is to music systems. In some cases a radio, tape recorder, and CD player are sold together in one unit. Such units are called boomboxes. In other cases the pieces are sold separately. This version is called a rack system and includes a tape player, an amplifier, a tuner, a CD player. Each piece is interchangeable with another of its kind. The consumer can buy a better amplifier and still keep his other pieces.

Although, CaTbox is an embedded PC, running DOS augmented with multitasking, the present invention could also be realized using any other operating system and processor pair.

SUMMARY OF THE INVENTION

Briefly stated, the present invention describes an embedded PC (CaTbox PT), without a keyboard, mouse or screen, but with a keypad and character based small screen, that is paired with a PC and assumes the routine communications functions for that PC. The link between the pair is a SCSI cable. CaTbox is connected to a printer via a parallel cable. CaTbox is connected to a scanner via a SCSI cable. CaTbox is also connected to multiple phone lines via phone wires and to handsets or receivers via phone wires. CaTbox is continuously powered on and consumes low amounts of power.

Viewed from the host PC, CaTbox looks like a. a SCSI hard disk (CaTdisc)

b. a print server c. a remote data/voice/fax modem(s) (CaTmodem)

d. a remote fax device(s) implementing the CAS protocol

As a standalone unit, CaTbox implements the following functions:

a. print files found in a spool directory and pointed to in a queue b. receive faxes and print them or store them on CaTdisc c. send faxes driven by keypad d. receive voice mail and store them on CaTdisc e. play voice mail back driven by keypad f. copy from scanner to printer g. other functions that may be programmed such as email retrieval, faxback and data modem based TCP/IP/PPP node, dial a phone number All functions implemented on CaTbox are based on a step table driven multitasking programming scheme built on top of DOS. Other applications such as email retrieval, faxback, WEB site delivery on TCP/IP/PPP may be realized in most cases by just writing step table sequences and foreground DOS programs. In sufficiently new and different applications one may need to write actions.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings:

FIG. 3 shows the physical composition of the CaTbox.

FIG. 6 is an example step table entry.

FIG. 11 step table sequence for fax back data base build

DESCRIPTION OF THE PREFERRED EMBODIMENT

Physical Configuration of CaTbox

Figure 1:
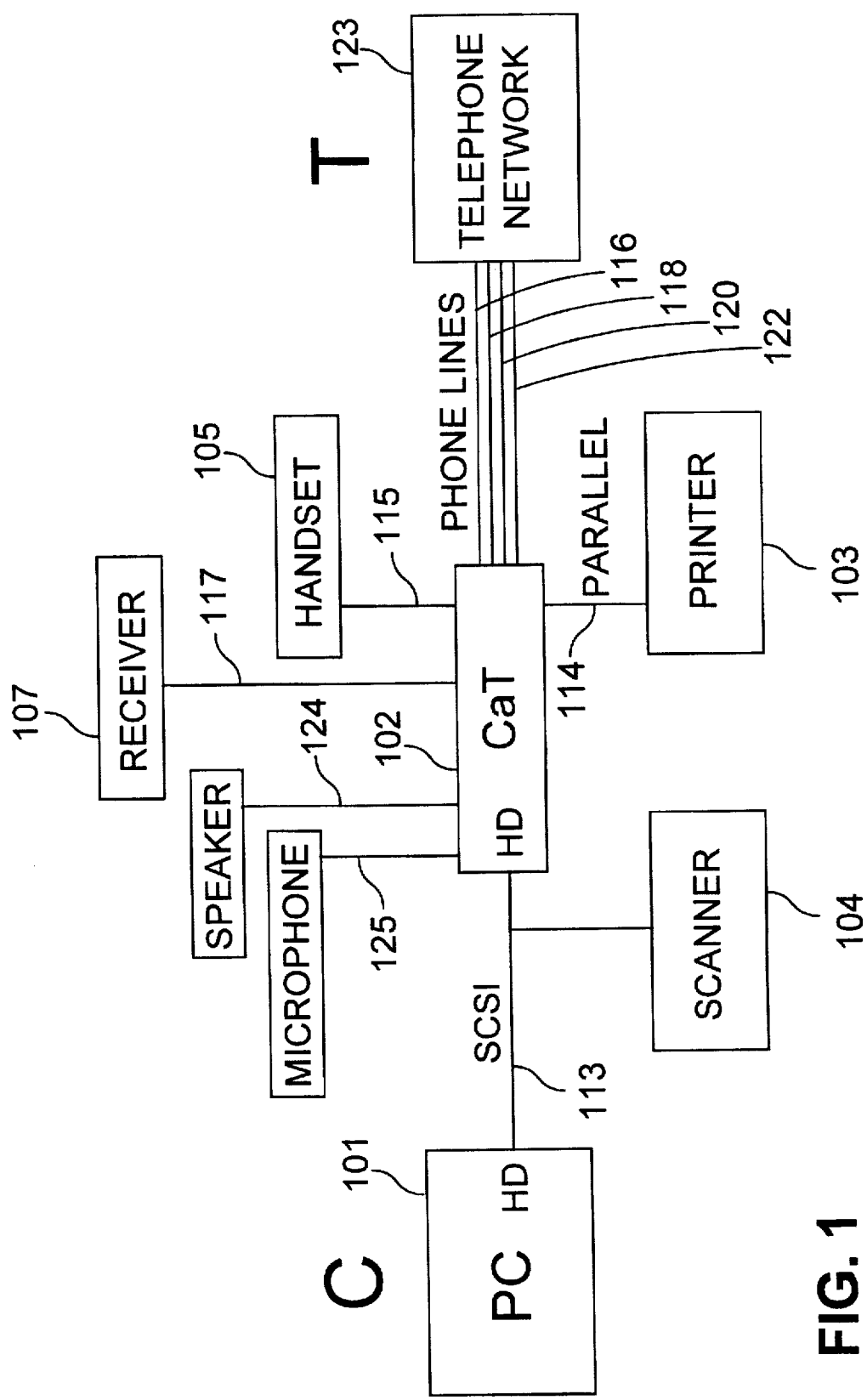
FIG. 1 shows how CaTbox is connected to a host PC, its peripherals and the telephone line.

FIG. 1 shows how the CaTbox is connected to a host PC, its peripherals and telephone lines. A Personal Computer (PC) 101, CaTbox 102 and scanner 104 are all connected to a SCSI bus 113. A printer 103 is connected to CaTbox 102 via a parallel cable 114. Handset 105, receiver 107 are connected to CaTbox 102 via common telephone wires 115,117. CaTbox 102 is connected to a Central Office 123 via common phone wires 116,118,120,122. CaTbox 102 is provided with speaker 124, and microphone 125.

Figure 2:
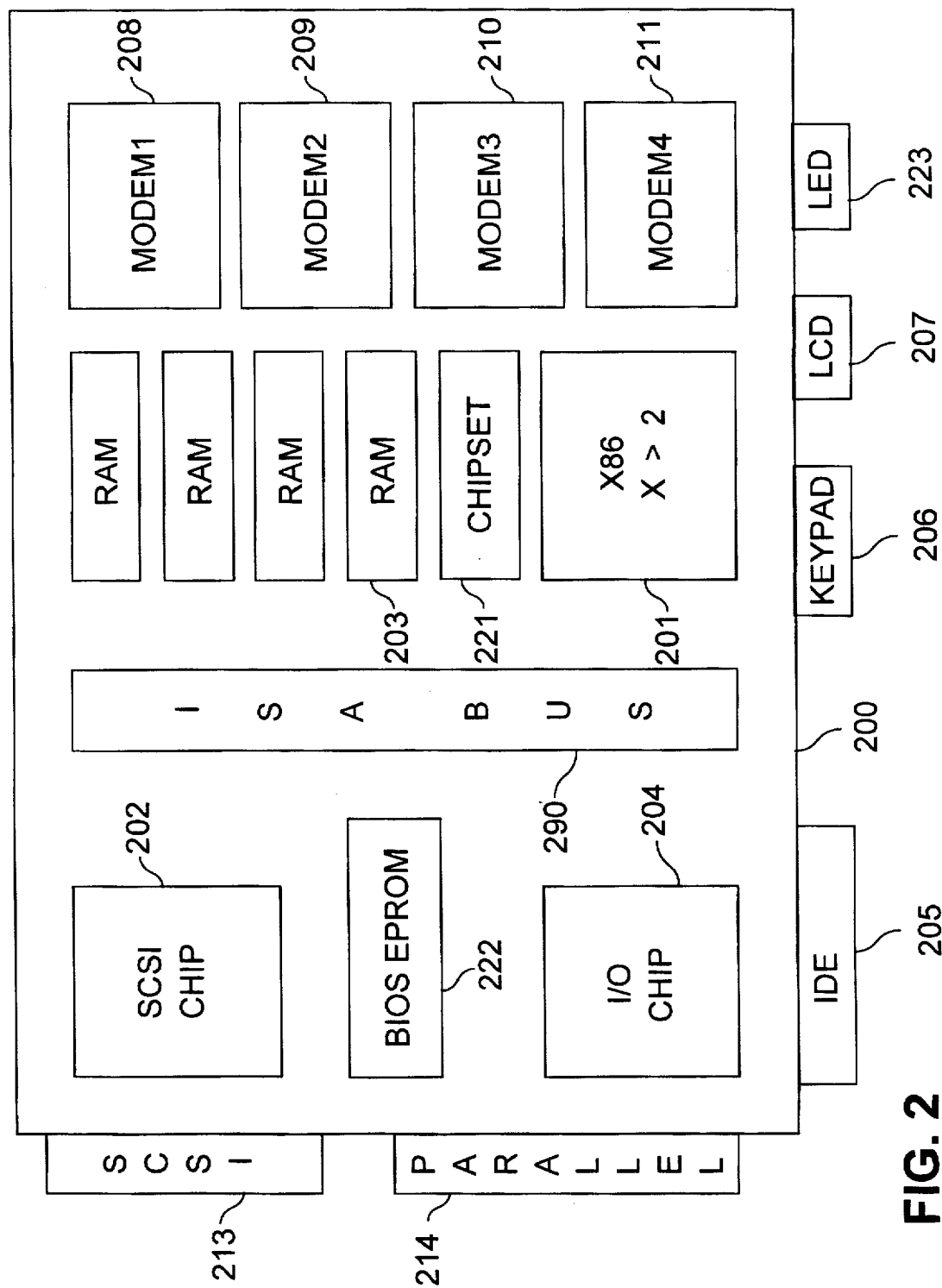
FIG. 2 is a schematic block diagram of the CaTbox motherboard.

FIG. 2 is a schematic block diagram of CaTbox motherboard 200. It is a stripped down, embedded PC without a monitor, keyboard or mouse. It is comprised of an ISA bus 290 to which are attached an X86 processor 201 and its associated chipset 221, a SCSI protocol chip 202 that is connected to a SCSI connector 213, PAM memory 203, an I/O chip 204, BIOS EPROM 222, and data/fax/voice modem daughterboard connectors 208,209,210,211. I/O chip 204 interfaces to a parallel printer connector 214, ATA/IDE hard disk connector 205, a keypad connector 206, an LCD display connector 207, LED device connector 223.

FIG. 3 shows the physical composition of a CaTbox. A casing 300 is similar to casings that are available for SCSI hard disks. It houses a power supply 302, a switchable fan 303, a hard disk 301, a motherboard 200 and daughterboards 308–311. Fan 303 is normally off. It goes on when a phone call comes in or the hard disk 301 is in a state of prolonged activity. A fan may also be unnecessary. Motherboard 200 is attached to a SCSI connector 213 and a parallel connector 214. The actual tie to SCSI bus 113 is implemented via SCSI connectors 312,313. SCSI connectors 312,313 are shorted to one another and to connector 213 inside CaTbox 102. The actual tie to parallel cable 114 is implemented via parallel connector 314. Connector 314 and connector 214 are shorted inside CaTbox 102. Motherboard 200 connects to a hard disk cable at connector 205. Said hard disk cable attaches to hard disk 301 at connector 325. Daughterboard 308 is connected to motherboard 200 via connector 208 and to a phone line via connector 315, to a handset via connector 316. Daughterboard 309 is connected to motherboard 200 via connector 209 and to a phone line via connector 317, to a handset via connector 318. Daughterboard 310 is connected to motherboard 200 via connector 210 and to a phone line via connector 319. Daughterboard 311 is connected to motherboard 200 via connector 211 and to a phone line via connector 321. Daughterboards 308–311 each contain a voice/fax/data modem chipset as well as a Data Access Arrangement (DAA). Connectors 315,316,317,318,319,321 are tied to phone wires 116,115,118,117,120,122 respectively.

Figure 4:
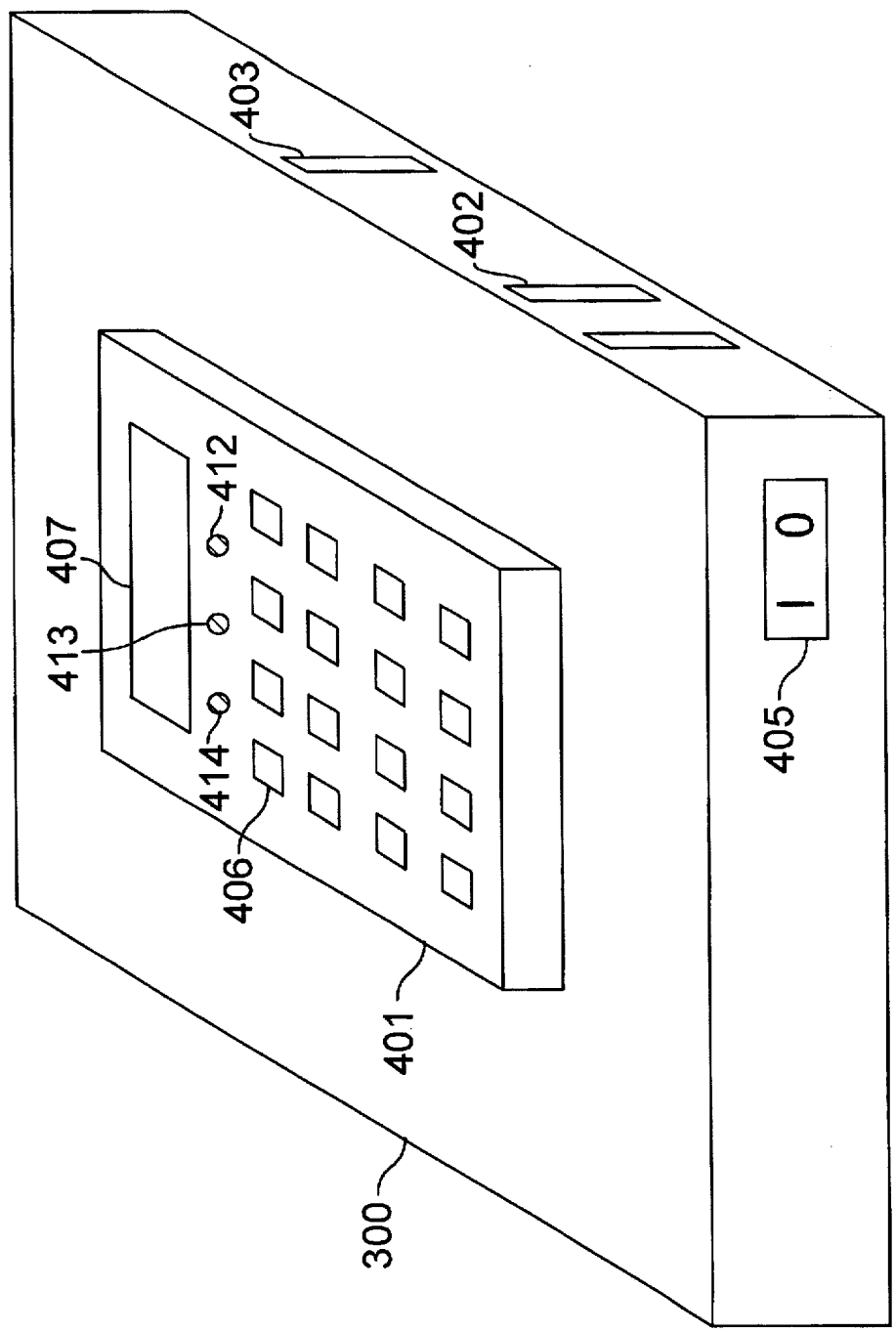
FIG. 4 shows a physical view of CaTbox from above.

FIG. 4 shows a physical view of CaTbox from above. The casing 300, may be of plastic or metal. On top of casing 300 is mounted a plastic frame 401 that supports the LCD display 407, keypad 406, and LED diodes 412,413,414. On the front side is a power switch 405. On the sides, air vents 403 and a fan vent 402 provide for air circulation. LED diodes 412,413,414 go on when CaTbox has received a voice message, a fax, or email respectively.

Software Architecture of CaTbox PT/PC pair

Figure 5:
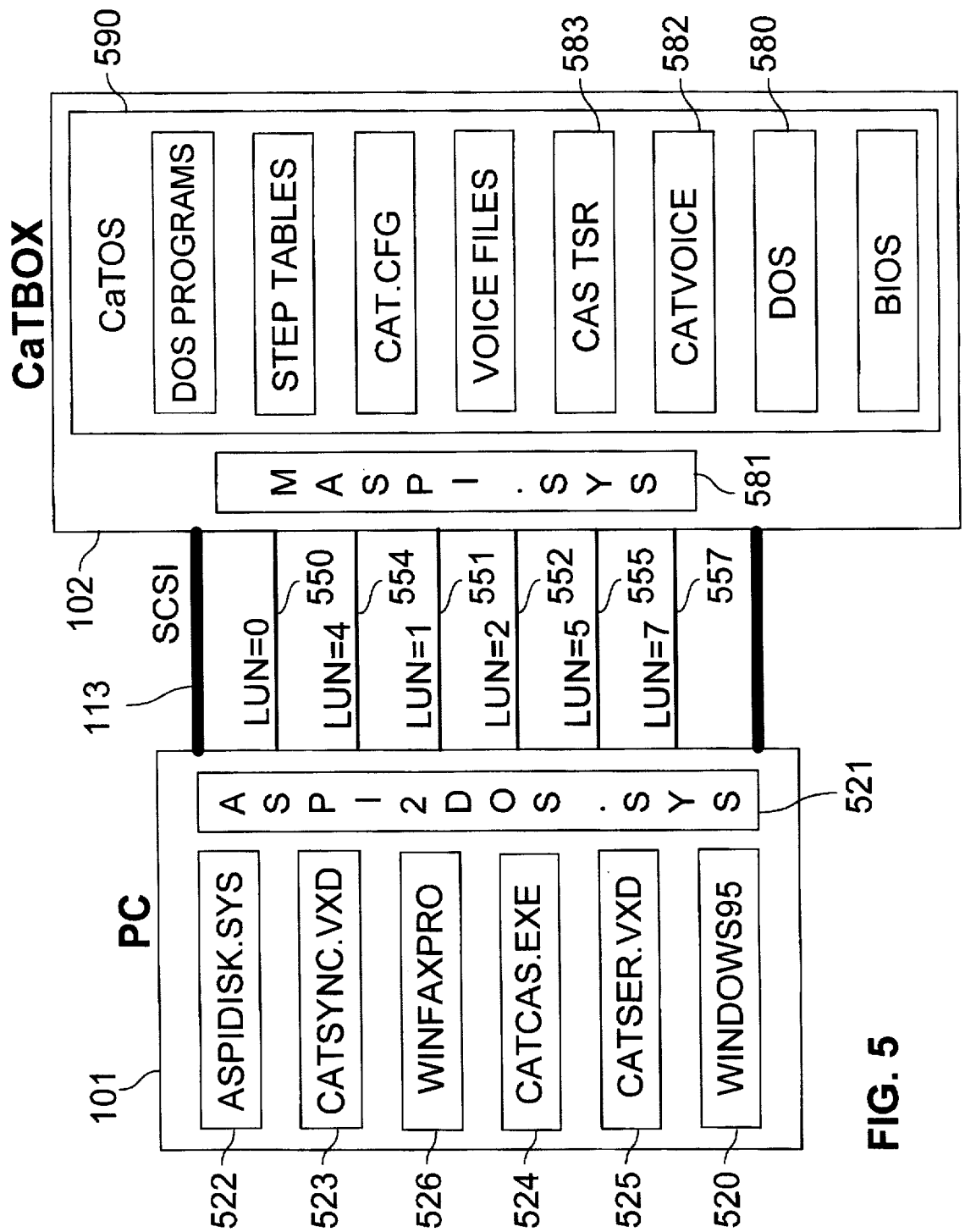
FIG. 5 is a schematic block diagram of the software subsystems residing on the PC/CaTbox pair.

FIG. 5 is a schematic block diagram of the software subsystems residing on the PC/CaTbox pair. The SCSI protocol allows for one node to represent itself as up to 8 Logical Unit Numbers (LUN's). CaTbox/PC software architecture makes ample use of this feature. A description of the SCSI protocol is given in X3.131 *small computer systems interface*-2 rev:101 date: Sep. 7, 1993 and X3T10/855D SCSI-3 parallel interface. In this document, we refer to SCSI as a protocol and not any specific underlying cable. Thus, for example, SCSI-3 Fiber Channel, SCSI-3 Serial Bus protocol may all be candidates to implement CaTbox connection to PC. Thus, SCSI cable 113 provides the physical frame for LUN=0 on CaTbox 102 SCSI node making the logical connection 550 to PC 101 in FIG. 5. Likewise, LUN=4 on CaTbox 102 SCSI node makes the logical connection 554 to PC 101 and similarly with LUN=1 making the logical connection 551, LUN=2 making the logical connection 552, LUN=5 making the logical connection 555, and LUN=7 making the logical connection 557.

As a standalone unit, with PC 101 on or off, CaTbox 102 can operate a scanner and a printer to implement document copy function, fax receive and fax send functions. It can also receive voice messages and store them to be played back, in the manner of an answering machine. Table I summarizes these functions:

TABLE I

Standalone Functions of CaTbox a. print files found in a spool directory and pointed to in a queue b. receive faxes and print them or store them on CaTdisc c. send faxes driven by keypad d. receive voice mail and store them on CaTdisc e. play voice mail back driven by keypad f. copy from scanner to printer g. other functions that may be programmed such as email retrieval, faxback, data modem based TCP/IP/PPP node etc.

In addition, as a part of its link with PC 101, CaTbox 102 is seen by the PC 101 as a SCSI disk, a print server, a remote modem (or modems if CaTbox 102 has multiple modems) and a remote fax device implementing the CAS protocol (A description of the CAS protocol is given in the book *PC Interrupts* by Brown and Kyle, Addison Wesley, 1991, Chapter 29). Table II summarizes these functions.

TABLE II

CaTbox provides the following functions to host PC a. a SCSI hard disk (CaTdisc)

b. a print server c. a remote modem(s) (CaTmodem)

d. a remote fax device(s) implementing the CAS protocol.

The logical connections mentioned above help implement these features.

Feature (a) in Table II is implemented with logical connections 550,554.

Feature (b) in Table II is implemented with logical connections 550,554.

Feature (c) in Table II is implemented with logical connections 552,555.

Feature (d) in Table II is implemented with logical connection 551, 557.

On the PC 101 side, Windows 95 520 provides the operating system. An ASPI driver such as ASPI2DOS.SYS 521 from Adaptec corporation provides the SCSI interface layer to all LUNs on CaTbox 102 SCSI node, as well as other SCSI nodes. Another driver from Adaptec Corporation, such as ASPIDISK.SYS 522 provides the disk driver. This driver utilizes the logical connection 550. In tandem with this driver, a virtual device driver called CATSYNC.VXD 523 implements the synchronization between the operating system of PC 101 and that of CaTbox 102 that access the same CaTdisc 301. The virtual device driver utilizes logical connection 554. CATSYNC.VXD 523 hooks the File I/O calls from the PC operating system (in this case Windows 95 520) and replaces the original call with the following:

if File I/O for CaTdisc notify CaTdisc of beginning of File I/O receive acknowledgment flush File I/O caches for CaTdisc make the intended File I/O call (LUN=0)

notify CaTdisc of end of File I/O

A Terminate and Stay Resident program called CATCAS.EXE 524 implements the remote CAS modem function. This program utilizes logical connections 551 and 557. CAS calls are int 2F calls with AH=0CBh to the X86 processor. When such a call is made from a Windows fax program 526, the program CATCAS.EXE 524 captures the call as it has hooked all such interrupts. It then routes it to CaTbox 102 via LUN=1 i.e. logical connection 551. There is no CAS-MODEM TSR on the PC 101. Therefore, we may call this a would be TSR (terminate and stay resident program). Instead, the int 2F call is delivered to CaTbox 102 where it is submitted to the CAS TSR 583 at the CaTbox 102. The results of this call are an action that the fax software carries out and returns values in registers. Right after, CATCAS.EXE 524 issues a SCSI write command, it also issues a SCSI read command to receive the results of the CAS call. When the SCSI interrupt routine at CaTbox receives the results of this Int 2F call in X86 registers, it returns the values to PC 101's CATCAS.EXE 524 which returns them to the Windows fax program 526 at the PC 101. To view a fax, a Windows fax program also makes a file read call. This call goes through LUN=0 as CaTbox is also a CaTdisc. There are some INT 2Fh calls that involve hard disk calls. We need to make sure that these calls do not corrupt local calls to CaTdisc. For example, while a fax is being sent from PC, an incoming call may be in the process of being recorded on CaTdisc. For this reason, the implementation of CAS translation utilizes LUN=7 to pass control information in the same way as it is done for CaTdisc accesses via LUN=4. This way, MAESTRO stops all foreground execution and calls back a routine in SCSIISR to clear the path for INT 2Fh calls.

A virtual device driver program called CATSER.VXD 525 implements the remote modem (CaTmodem) function. This program utilizes the logical connections 552,555. This program acts as a port driver for Windows 95 520 operating system. It registers itself as a port driver for certain communications ports such as COM 3 and COM 5. From then on, the PC 101 operating system 520 calls CATSER.VXD 525 whenever applications make I/O calls to this particular port or ports. This scheme does not use any hardware interrupts on the PC 101 as there really is no modem on the PC 101.

When a call to write data from a buffer to a port arrives, CATSER.VXD 525 makes note of the number of bytes and where they are. It then sends these bytes to CaTbox 102 using the logical connection 552. At the CaTbox 102, the transmit buffer interrupt of a modem out of the modem set 308–311 is enabled. When the interrupt comes, the bytes are delivered to this modem. There is no modem on PC. For this reason a port on PC is called a would be port. The physical port is on CaTbox.

When the receive buffer of a modem from the modem set 308–311 becomes non empty, a receive buffer interrupt is generated at the CaTbox 102. The interrupt service routine inside MASPI.SYS 581 reads the bytes in the FIFO of a modem from the modem set 308–311. When a read call comes, these bytes are delivered to the PC 101 using the logical connection 555.

On the CaTbox 102 side, DOS 580 provides the basic operating system. \MASPI.SYS 581 provides the drivers for the SCSI connection. MASPI.SYS is composed of MASPI proper which is a mini Advanced SCSI Programming Interface (ASPI) driver and SCSIISR which executes SCSI related interrupt service routines. ASPI is defined by Adaptec Corporation in a document called *Advanced SCSI Programming Interface Software Developer's Kit Manual*. MASPI.SYS also manages the transitions of CaTbox SCSI node from initiator mode to target mode and back. SCSIISR, in particular, translates hard disk SCSI read/write calls to local INT 13h calls to CaTdisc. CaTOS 590 is the name given to the multitasking operating system atop DOS 580. In a sense, CaTOS also includes DOS as it uses DOS to make file I/O calls, read the time, and start CaTOS programs.

The following directories and files comprise the CaTOS 590 files (note that to DOS in CaTbox 102 CaTdisc 301 is disk C, to PC 101 CaTdisc 301 may take any letter depending on the order in which its driver was installed:

C:\CATBOX\CAT.CFG

C:\CATBOX\SCSI\MASPI.SYS

C:\CATBOX\CATSTEPS\*.BIN

C:\CATBOX\PROGRAMS\*.EXE

C:\CATBOC\VOICE\*.PCM

C:\CATBOX\VOICE\*.QUE

C:\CATBOX\PRINT\SPOOL\*.PCL

C:\CATBOX\CATVOICE\CATVOICE.EXE

C:\CATBOX\FAXBACK\FAXBACK.IDX

C:\CATBOX\FAXBACK\FAXBACK.IDY

C:\CATBOX\FAXBACK\CAS.EXE 583

C:\CATBOX\EMAIL\IN.TXT

The significant programs in CaTOS 590 are:

MASPI.SYS 581, a DOS device driver referred to in CONFIG. SYS.

CATVOICE.EXE 582, a DOS TSR referred to in AUTOEXEC.BAT. CATVOICE.EXE is composed of the following modules:

TTISR, SERISR, ACTIONS, MAESTRO, CVBOOT, SYSDATA.

The following is a description of how the CaTOS operating system works. CaTbox responds to inputs from three different sources:

a. PC b. phone line c. keypad

In addition, there are multiple modems in the CaTbox. The multiplicity of modems and inputs creates a need for a scheme to allocate resources to implement tasks.

Figure 8:
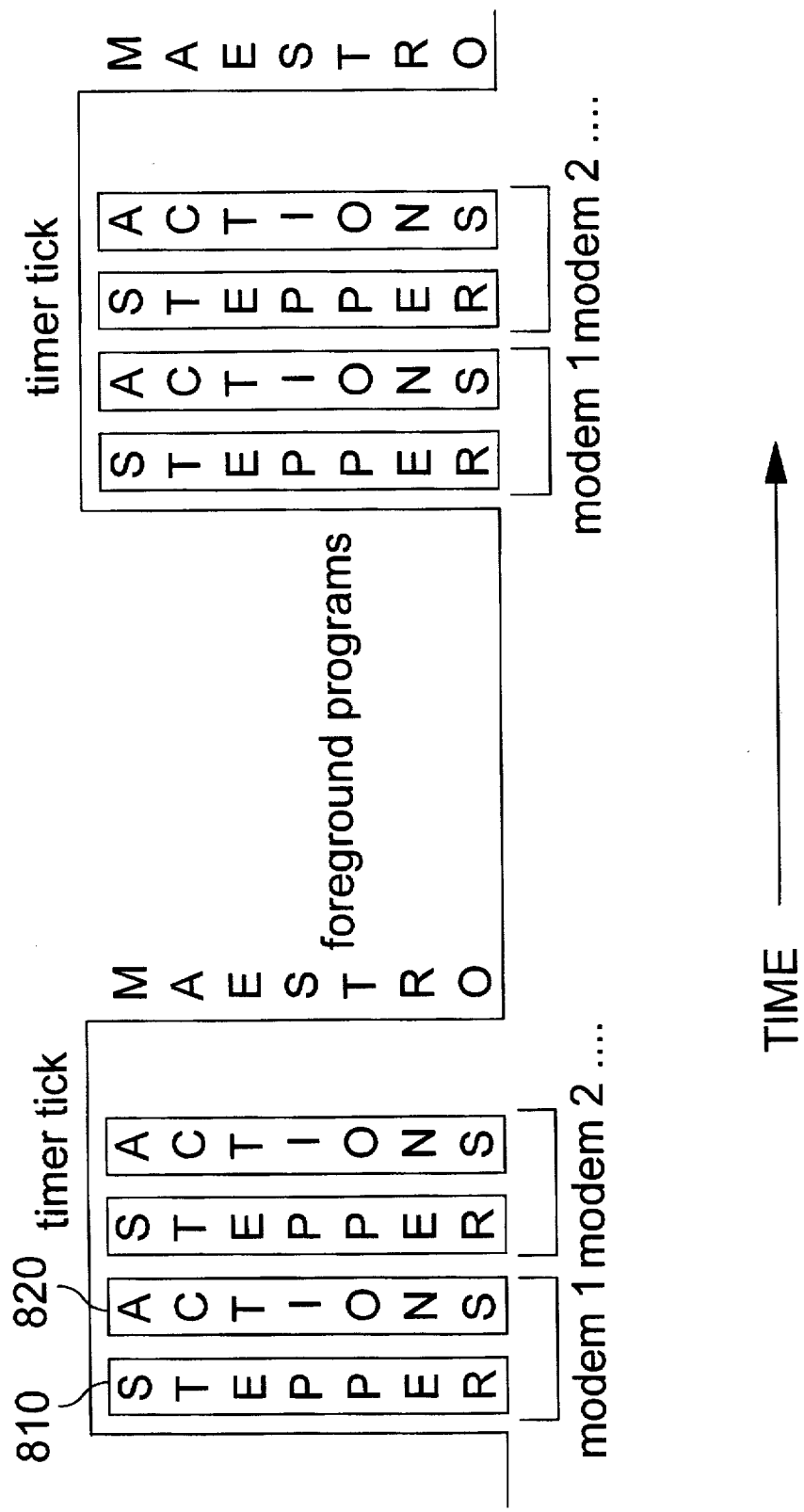
FIG. 8 is a timing diagram showing when various software components are active.

The inputs from PC were discussed previously. The response of each modem to inputs from phone line or keypad are defined by a STEP TABLE. An example STEP TABLE entry is shown In FIG. 6. Each STEP TABLE entry specifies an ACTION. It also specifies what the next step will be based on the DTMF inputs during this step, or keypad inputs during this step, or various other conditions during this step. CaTbox, being a PC, has a recurring interrupt called timer tick. Code called STEPPER 810 as shown in FIG. 8, is executed during each timer tick, for each modem. This code reads the STEP TABLE entries 600, determines the ACTION 820 to call, and after the action is completed after many timer ticks, determines the next step to run. STEPPER 810 is in module TTISR. This is called the level_0 stepper. ACTION 820 is in module ACTIONS. In addition, there may be STEPPER code inside ACTIONS. These are higher level steppers. During execution of an ACTION, DI register keeps track of the level of stepper. Certain variables in the MODEM DATA STRUCTURE are used for every level.

These variables are accessed with index DI. Higher level steppers make it possible for ACTIONs to call other ACTIONs. The STEP TABLE entry is somewhat like a program line, the STEPPER is like a program counter and instruction decoder and the ACTION is the microcode that implements the desired function.

| ASSEMBLY LANGUAGE PROGRAMS | CATOS PROGRAMS |
| --- | --- |
| program line | STEP TABLE entry |
| instruction decoder, program counter | STEPPER |
| microcode | ACTION |

Figure 7:
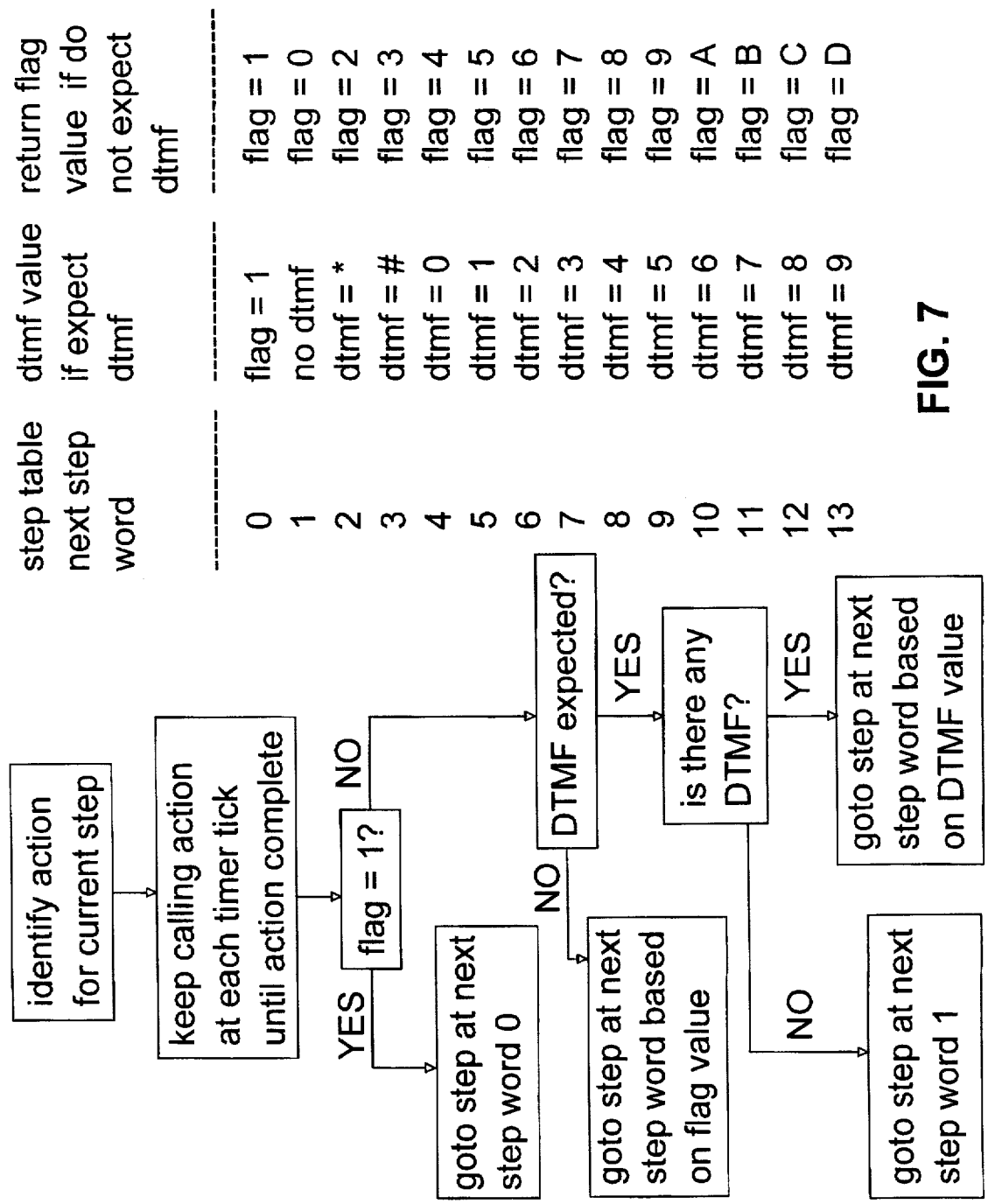
FIG. 7 is a flow diagram of the stepper code.

In FIG. 6 the first line in the STEP TABLE entry defines the ACTION for this step. The second line is where the return flag value is stored. The next few lines define the next step numbers based on either DTMF inputs or return flag values. Each STEP TABLE entry is reached by the STEPPER via a number specific to this entry. The last block of data are the parameters for the action. The first one specifies whether this action will accept DTMF inputs or not. If the ACTION accepts DTMF inputs, then the next step will be determined by DTMF value. The first entry in next step area will be for the case when flag value=1. The next entry will be for the case of no DTMF. The following lines will be for DTMF= *,#,0–9 respectively. If this action will not accept DTMF inputs, then the next step is defined by the return flag value. The first entry in next step area will be for flag=1, the next for flag=0,2,3–9,A,B,C,D respectively. Note that if out of an ACTION, the flag value is 1, then the next step is the same independent of whether DTMF inputs are accepted or not. The table in FIG. 7 summarizes these results. Return flag may be set to a value depending on results in an ACTION. For example, if ANNOUNCE_AND_COLLECT_DIGITS has a wrong password entry, the flag is set accordingly for the next step to emit a message alerting the caller that the password was wrong.

In the particular example of FIG. 6, the next entry in the parameters block is an offset within the step table segment to the name of the voice file to play for this ACTION. This action happens to be ANNOUNCE_AND_COLLECT_DIGITS. So the voice file name is for the announcement. The third entry tells the ACTION which type of ANNOUNCE_AND_COLLECT_DIGITS this is. Possible choices are: get a phone number, get a faxback document number, get a voice mail number etc. The entry with the variable name 'vcon_session_faxback_doc_number' points to a location within the step table where this ACTION will store the received faxback document number. A subsequent step may also refer to this variable for a different ACTION. This may be a START_PROGRAM action where the program reads an index file and translates this document number into a fax file name to transmit back to the caller who requested it in the first place.

Finally, along with voice, steps may show LCD messages. If an LCD message is desired, then the parameter value is LCD_MESSAGE_YES. The message text will be typed in following this variable. In this case, we have a 2×20 LCD and so each screen is composed of two lines of 20 characters each and each screenful of text ends with 00h. The last message ends with 00h,00h.

There are two data structures for each modem. One is the STEP TABLE and its segment value is loaded into the FS register. The other is called MODEM DATA STRUCTURE (MDS) and its segment value is loaded into the GS register.

The name of the STEP TABLE for each modem is given in the file CAT.CFG. A module inside CATVOICE, called CVBOOT examines CAT.CFG and loads the required STEP TABLES from hard disk to allocated memory segments. CVBOOT then builds a table of FS,GS value pairs for each modem. When code associated with a modem is executing, there are three data segments that are of importance: STEP TABLE data segment (FS), MODEM DATA STRUCTURE data segment (GS), and SYSTEM DATA segment (DS).

As shown in FIG. 8 during timer tick, each modem, gets a time slice where the ACTION code is executed. Before the timer tick slice for each modem, the proper FS, GS segment values are loaded. The system data segment (DS) value does not change.

As shown in FIG. 7 the STEPPER code for a modem checks the ACTION for the current step and makes a call to that ACTION. ACTIONS are code that is designed to execute within the timer tick. Thus, care is taken to execute small chunks of code and not leave any wait loops such as when one expects OK from the modem for a Hayes command such as ATH.

Actions are procedures that are entered at each timer tick until they get completed. They are akin to microcode sequences that implement assembly language instructions. In this case, the corresponding entity to an assembly language instruction is the step table entry. Each action is passed a number of variables. One of these variables tells the ACTION that this is its first timer tick. The ACTION performs some initialization after which it sets this variable to false so that it does not enter this section of code at subsequent timer ticks. Another variable the ACTION gets is the address within the step table segment of the ACTION's step table entry. With this, the action can read the parameters values it gets to use. An example of such a parameter is whether the ACTION will check DTMF values or not. For an EMIT_MSG ACTION, a parameter is the file name of the voice file to play.

Each ACTION also has a variable that points where within the ACTION the next code segment to execute is. When ACTION code is entered, this variable is checked to decide which section of code to execute. Finally, a variable is set so the STEPPER will not call this ACTION within this step again. The STEPPER then proceeds to find the next step based on either flag value returned from previous ACTION or DTMF values received during the same action. For ACTIONS that complete once one DTMF value is received, STEPPER decides using DTMF values. For actions that expect multiple DTMF ending with #, STEPPER decides based on return flag values.

The names of some ACTIONS that are currently available are:

| | |
| --- | --- |
| EMIT_MSG | plays a voice *.PCM file to an output device |
| RECO_MSG | records from an input to a hard disk file |
| START_PROGRAM | submits a DOS program to MAESTRO_TASK_QUEUE (MTQ) |
| TMO (TMAESTRO) | ACTION for the mother step for each modem (TMO stands for Timer Tick Maestro) |
| NO_ACTION | does nothing for a number of timer ticks |

| | |
|---|---|
| ACD | Announce and Collect Digits. plays a message and collects DTMF digits such as phone numbers |
| HANG_UP | hangs up the modem |
| TTQ_REQUEST | submits a request to TMAESTRO TASK QUEUE (TTQ) |
| VMA | Voice Mail Access |
| DIAL | Dial a phone number for telephone connection |
| CONN_PPP | To establish a PPP connection |
| CONN_TCPIP | To establish and maintain a TCP/IP connection |

It is possible to have ACTIONS within ACTIONS. Currently ACTIONS may be 16 levels deep. There may be more. For example, ACD is called within timer tick by STEPPER LEVEL_0. It, in turn, has a STEPPER LEVEL_1 that calls EMIT_MSG, which has a STEPPER LEVEL_2 that calls START_PROGRAM.

ACTIONS do not make DOS calls. Thus, what happens during timer tick is controlled. An exception is CAS TSR. Under control of CaTOS, CAS is given control to execute on an incoming or outgoing fax. This code makes DOS calls during timer tick. Care is taken so that this different behavior does not impede the operation of CaTOS.

When there is a need to make DOS calls, the STEP TABLE includes an entry whose ACTION is called START_PROGRAM. This ACTION, places a request to run a program to the MAESTRO_TASK_QUEUE (MTQ), a data structure in SYSTEM DATA SEGMENT (DS). In this way, fairly complex programs may be run in the foreground. We distinguish between the background and foreground. Background is the time during timer tick interrupt. Other interrupts such as SCSI hardware interrupt and UART hardware interrupt are also background. Foreground is the remaining time. For example, when a DOS program runs, it runs in the foreground. Foreground programs act as if all system resources belong to them. Such programs, when they make DOS calls, do not need to check if another entity already has made a DOS call. This is important as DOS is not reentrant. Background programs however have to follow strict rules. They must check to see if a DOS call was in progress when they acquired control via a hardware interrupt.

If a timer tick was entered and the InDOS flag was equal to zero, meaning that no DOS INT 21h call was being made, control passes to a module of CATVOICE called MAESTRO after the end of timer tick. The relevant information for code that was executing as timer tick was entered is saved. MAESTRO examines the MTQ to see if there are jobs that need to be started. It also examines MTQ for any suspended jobs. MAESTRO either does nothing, or resumes a job, or starts a job. This is how, STEP TABLE sequences may make DOS calls.

MAESTRO is also involved when CaTdisc is accessed by host PC. MAESTRO works with a queue called MTQ i.e. Maestro Task Queue. Each entry in this queue is called MTICS ie Maestro Task Information & Control Structure. Each MTICS has the following entries:

MTICS_PGM_STATUS which shows if the program associated with this entry is IDLE, RUNNING, SUSPENDED, COMPLETED.

MTICS_HANDSHAKE which shows the status of linkage with the START_PROGRAM ACTION that placed this request. Its values may be NULL, ST_REQ_MADE, meaning START_PROGRAM has made a request, M_REQ_ACKNOWLEDGED, meaning that Maestro acknowledged the request. START PROGRAM bases its decision to continue on the value of this last variable. If request was acknowledged, START_PROGRAM either goes in a wait mode if this was prescribed in its STEP TABLE entry, or it terminates if no wait mode was specified.

MTICS_PRIORITY which shows the priority of the program. For example, ACTIONS that play voice will need to load the voice data to memory from hard disk files immediately. Indeed, the contents of voice files are loaded to hard disk cache first. The reason for this design choice is twofold: one, voice files take up a lot of memory space to load it all into memory; two, ACTIONS are not allowed to make DOS calls from within timer tick to load voice data directly from hard disk files in small chunks. DOS calls are complex and the time they take is variable. In contrast, BIOS 13h calls to hard disk are of well defined shorter duration. Each INT 13h call during timer tick, checks to see if an INT 13h call was in progress when timer tick was entered. If so, the call is skipped to check again at the next timer tick.

At boot time, each modem is assigned a hard disk cache space. This space is beyond the DOS partition. Neither DOS on CaTbox, nor Windows 95 or equivalent on the host PC is aware of this space. It may only be called with INT 13h calls.

Priorities for programs in MTQ may be HI, LO, PERMANENT, DATA_MODEM. Programs such as LDFTOMEM.EXE that load voice data to hard disk cache are HI priority. There are other programs such as FP.EXE, that prints files in CaTdisc spool directory, that are called from time to time as they are initiated from TMAESTRO TASK QUEUE (TTQ). Such programs, when they return, do not free their MTICS entries. PERMANENT refers to such entries. Finally, DATA_MODEM is a priority given to programs activated during handling of host PC modem calls as they are translated into SCSI calls to finally drive modems on CaTdisc.

Remaining items on MTICS store the number of timer ticks lapsed from the time the program was launched, and the register values at the time of the arrival of this timer tick, if the program is about to be suspended.

At each timer tick register values (call them R) are stored into a Client_Regs structure (call it CR):

R -> CR

If MAESTRO is to come at the end of this timer tick, then the following moves take place:

CR -> SR, where SR denotes Saved_Regs

MR -> CR, where MR denotes MAESTRO register set

Finally, at the end of the timer tick, we have:

CR -> R, so that MAESTRO is activated.

If MAESTRO decides that the running program is to be suspended in favor of a higher priority program, then MAESTRO makes the following move:

SR -> MTICS to store the running program's registers.

Figure 9A:
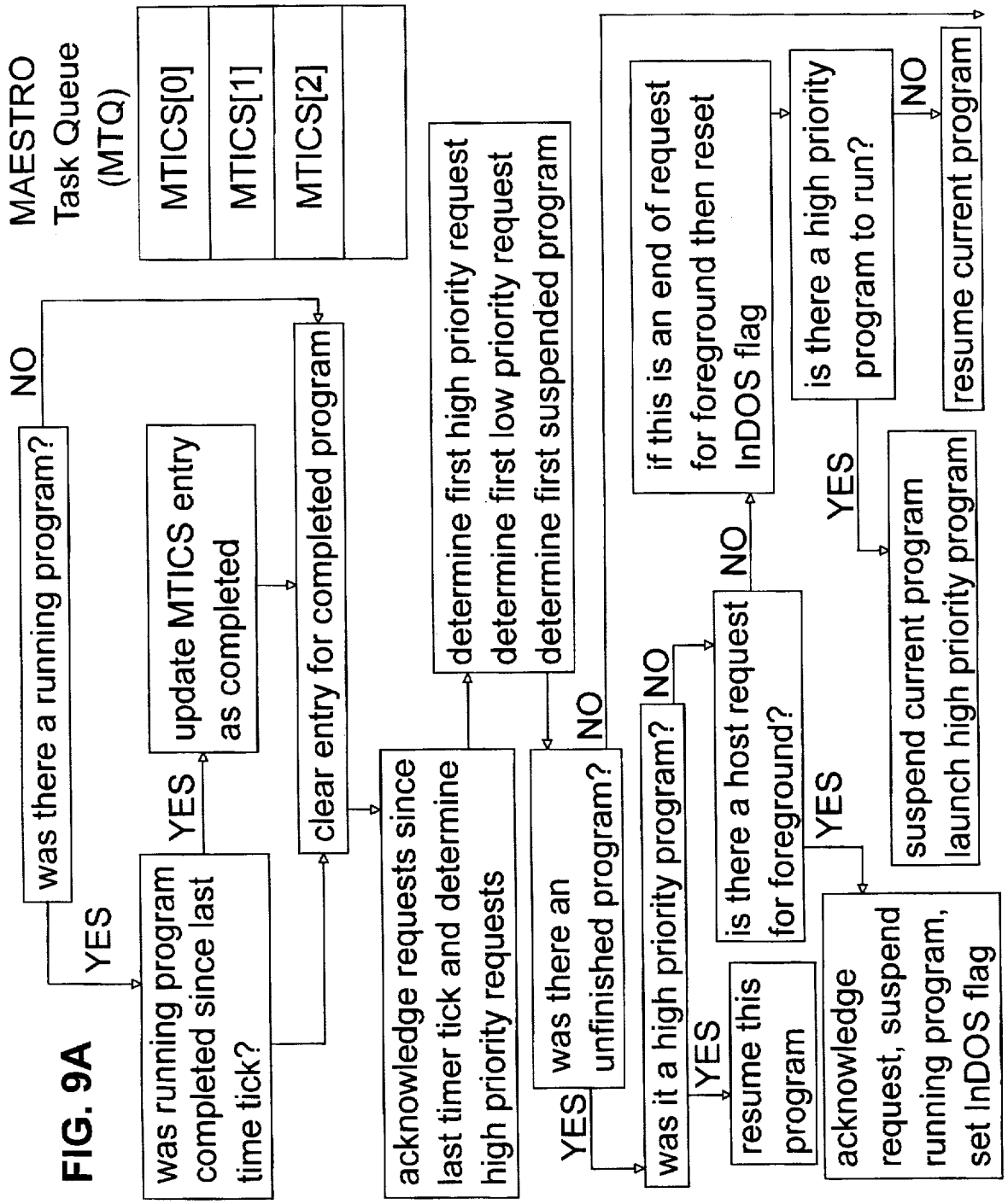
FIG. 9A,B is a flow diagram of MAESTRO decision code
Figure 9B:
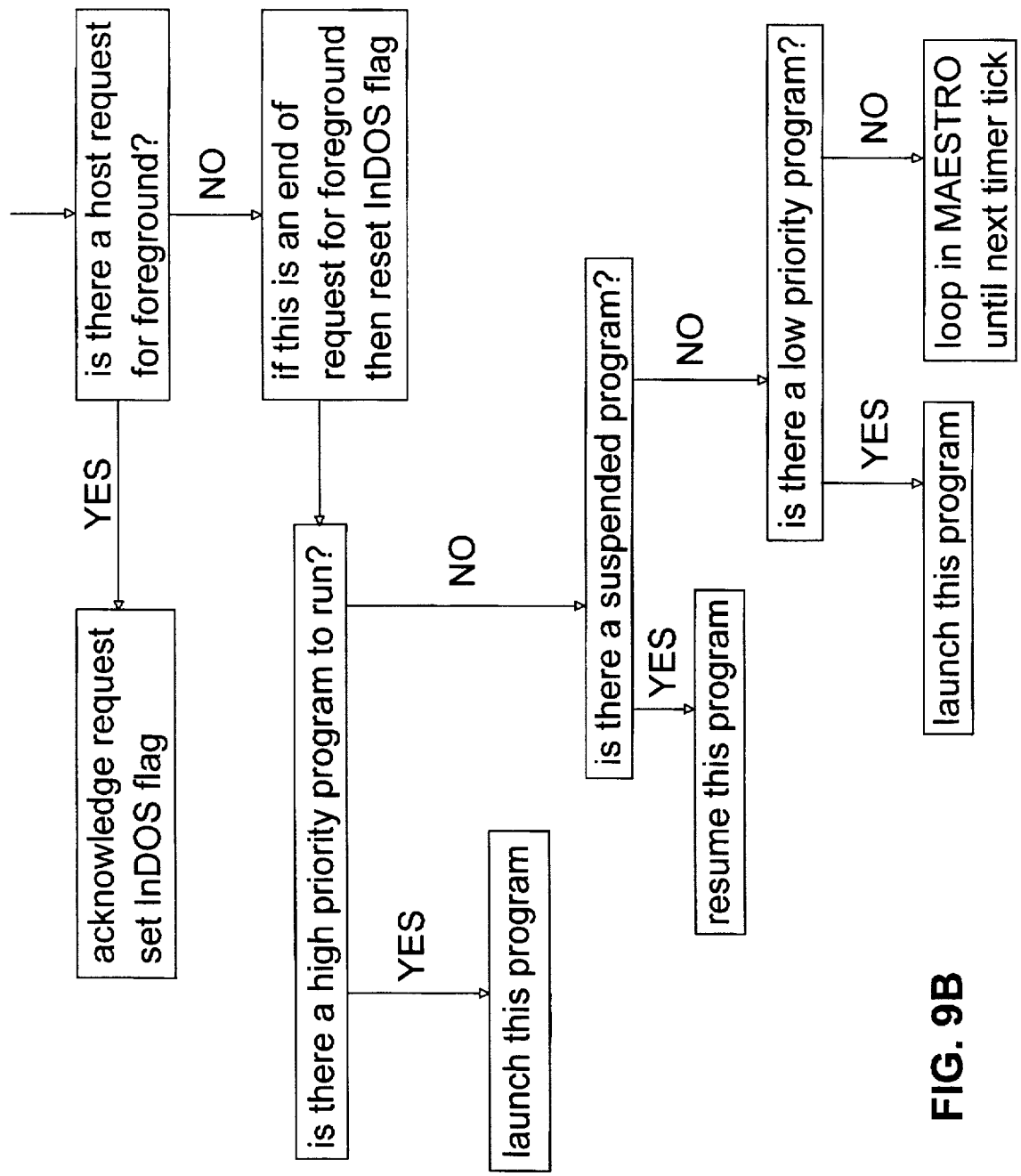

FIG. 9 shows MAESTRO's decision tree. MAESTRO is also involved when host PC makes a CaTdisc call, or when host PC application makes a CAS call. In these cases, MAESTRO waits until all high priority programs have executed and then stops launching new programs. MAESTRO then checks for a call back address and if this address is non zero, calls a routine at this address. The callback routine is inside MASPI.SYS (specifically, inside SCSIISR). This routine responds to the receive acknowledgment section of the CaTdisc call. When the CaTdisc call or CAS call sends a notification of the end of File I/O to CaTbox, MAESTRO resumes its normal operation.

Figure 12:
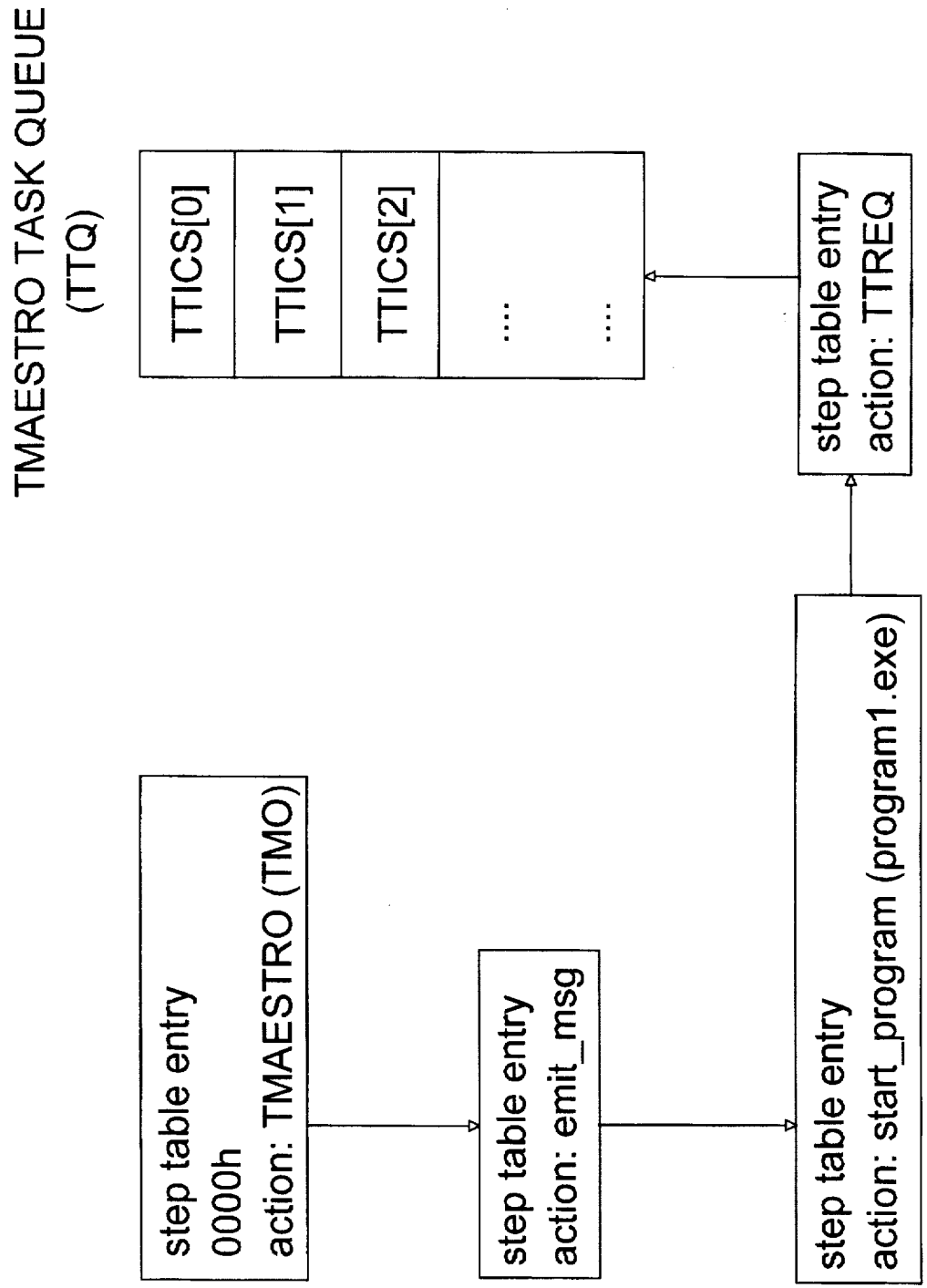
FIG. 12 an example step table sequence ending in a request to TTQ

In some cases, a task may not be accomplished during one sequence of STEP TABLE entries in a particular modem. For example, modem 2, may, following a sequence of steps, generate a TASK CONTROL FILE (TCF) for a faxback request. This happens during an inbound phone call. To satisfy the faxback request, however, we need a free modem to make an outbound call. The sequence of steps in the STEP TABLE must now be broken. As wait loops are not allowed inside the timer tick, a request is placed in a SYSTEM DATA queue called TMAESTRO TASK QUEUE (TTQ) . This request specifies the number of the STEP to go to. Each request gets placed in a TTQ entry called TTICS (TMAESTRO Task Information & Control Structure). An example is shown in FIG. 12.

Figure 10:
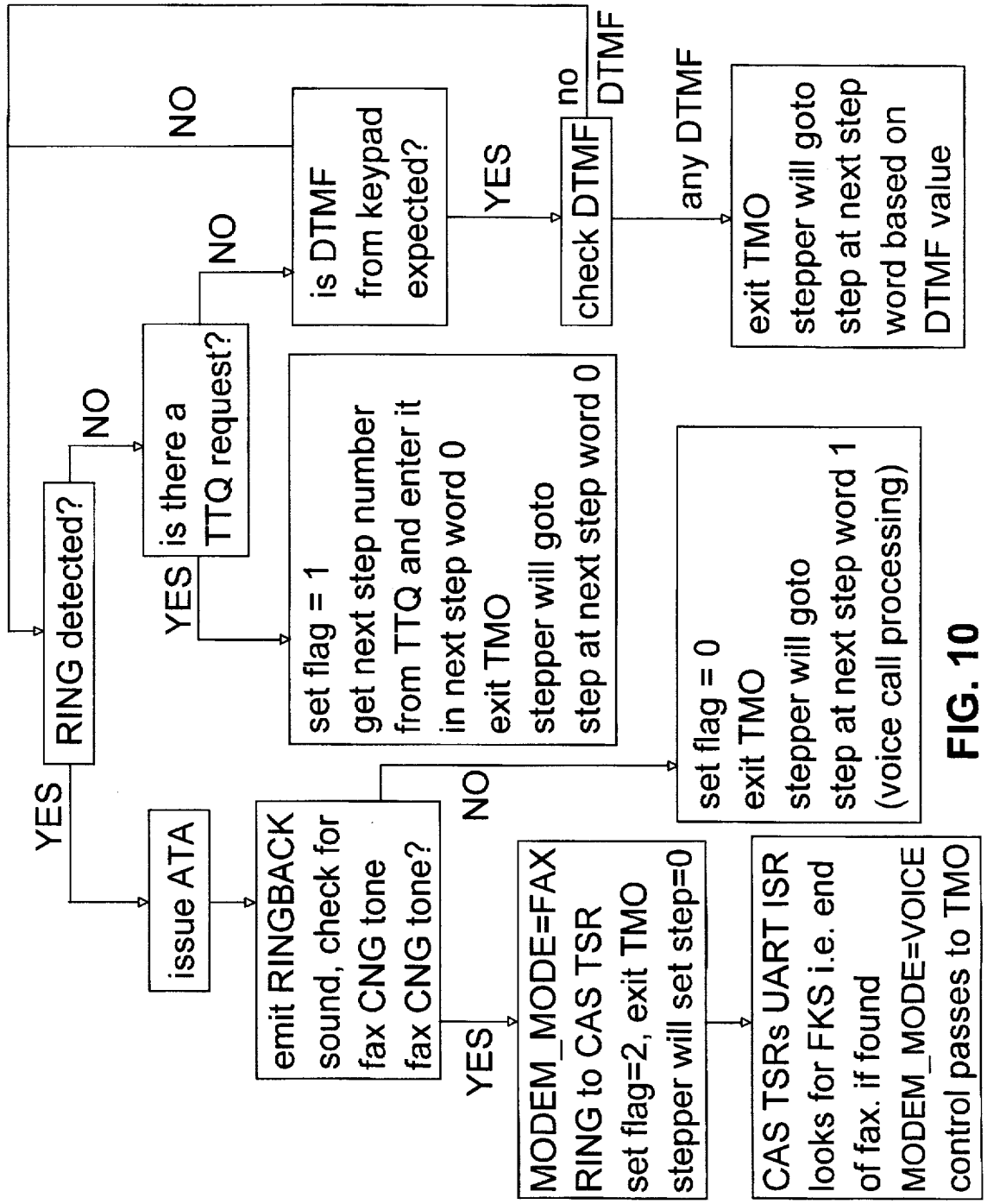
FIG. 10 is a flow diagram of TMAESTRO (TMO) action's decision code

When modems have nothing to do, they return to the mother step 0. There, in all STEP TABLES, the ACTION is TMO (TMAESTRO) . FIG. 10 shows a flow diagram of TMO's decision code. One of the checks TMO makes is to see if TTQ has any requests in it. If there is one, such as send faxes for faxback, TMO checks to see if resources are available for the task. For example, a fixed line may be dedicated to cater to faxback requests. In this case, only that modem's TMO will find that the resources are available to enter this sequence in the STEP TABLE. Once entered, this sequence of steps will make a call to the faxback requester's fax machine and send the fax. The task of building a TCF based on the caller's request and delivering the faxback, thus takes two segments of STEP TABLE sequences. We call each such segment a RIBBON. The first part, that is the caller placing his requests is the INBOUND RIBBON and the second part where we deliver the faxback is called the OUTBOUND RIBBON.

CaTOS Programming Interface

Another significant advantage of CaTbox is the CaTOS operating system. Fax machines that bundle scanners, printers and modems are usually closed systems that can only be programmed at the factory. Answering machines are also preprogrammed except for recording new greetings. CaTbox has a DOS based multitasking system called CaTOS that enables script driven programming augmented with regular DOS programs. The example in FIG. 11 shows an application that was implemented using CaTOS programming interface. This application builds a fax back data base. With the push of a button, the user brings a CaTbox STEP TABLE corresponding to a modem to step 0046h from step 0000h that is, the mother step TMO. In the following, we summarize the steps involved in building a fax back data base:

1. Play a voice message and display LCD message asking for a fax back document number. If given, go to step 2, else return to TMO.
2. Play a voice message and display LCD message asking the user to place the document that will go into fax back data base on the scanner and then to press 1 (go to 3). If the user is done with all the pages of this document, he is to press # (go to TMO).
3. scan the page, make a DOS file name based on date/time, and place the data in this file. Store the filename in the step table. Go to 4.
4. add the document number and filename to the fax back index file. Go to 2.

The action for step table entry 0046h in FIG. 11 is ANNOUNCE_AND_COLLECT_DIGITS. This implements step 1 in the previous paragraph. The action for step table entry 0047h is EMIT MSG. Both these actions come with CaTOS. The actions for the next two steps are the same: START_PROGRAM. This action also comes with CaTOS and serves to launch DOS programs. For step table entry 0048h, the DOS program is called SCTOPCL.EXE. This program drives the scanner to scan a document, make a file name for it and store into this file. The last step table entry, 0049h, uses BLDFBXDB.EXE. This program takes as inputs, the file name and the document number and inserts these into a line in a file called FAXBACK.IDY.

Writing this application was relatively easy. The programs that needed to be created were SCTOPCL.EXE and BLDF-BXDB.EXE. Actually, SCTOPCL.EXE is a standard program that is used in multiple instances as it scans a page.

To summarize, to develop any application with CaTOS, the programmer must:

1. always write a STEP TABLE SEQUENCE, insert it into a current step table source file, assemble this file turn this file into a binary file using DOS DEBUG, write this file to CaTdisc:\CATBOX\CATSTEPS\*.BIN edit CaTdisc:\CaTbox\CAT.CFG to update the step table name
2. sometimes write a DOS PROGRAM, refer to this program in the step table entry where the action is START_PROGRAM, place the executable in CaTdisc:\CATBOX\PROGRAMS\*.EXE.
3. very seldom write an ACTION.

PC/PT Programming Model

The outlines of a method to write programs for the PC/PT pair will be described with an example. Suppose a software company intends to develop an application for Windows where users could access their bank accounts and conduct transactions. There is a part of this task that can be automated: downloading a checking statement. There will be cases where the user will just want to do this. There is no need to turn the PC on just for this although it could be done from the PC. This software company will then write a component of this application that can be driven from the keypad of CaTbox PT. It is desirable that the outcome of the download be printed. It is also desirable that this data be preserved on CaTdisc for the application from PC to make it a starting point for further transactions if the user so desires. The requirement, then, is that the CaTbox component be aware of the file structure of the PC component so that it can deliver data PC component can recognize.

To make this model more general, assume a file of multimedia data comes in from a distant source. The reception could be initiated by a remote source such as incoming fax, or by a local source such as push button on CaTbox. By multimedia data we mean text and images (visual data), sound (auditory data), or video (visual data). This data could be a fax for example. CaTbox would read this data and store it on CaTdisc as a file. The application program on PC would poll for the arrival of this file at any time. Once it found it, it would display it. Conversely, if an application on PC intends to send multimedia data to a distant receiver, this application would write this data to CaTdisc as a file and would alert a program on CaTbox. The alerted program would wake up and send the data right away or at a later time. This is a model of division of labor between PC/CaTbox PT.

Telephony Applications

CaTbox may also act as a telephone providing a receiver is added to it, instead of a handset. The receiver should sit on an off hook/on hook cradle. The receiver's connection may also be a wireless one. A phone number may be dialed with push buttons on CaTbox under control of the action DIAL. When the connection is made, the user may pick up the receiver and start talking. A record may be kept of the number dialed and the time. When a call comes in, caller id circuitry may detect the caller's phone number. This number may be stored on CaTdisc in a log file with a note that this call is starting. The action TMO may determine that this is a voice call. A polling program on PC may detect that a voice call has come in by checking this CaTdisc file. It would then open up a window with information about the caller.

Internet Applications

CaTbox may be used as an Internet World Wide Web HTTP server. Content developed on PC could be written to CaTdisc for delivery. A specific keypad sequence would start the ACTION CONN_PPP making a connection with an access provider using the PPP protocol. Once established, CONN_TCPIP action would take over. This action would implement the TCP/IP protocol. For an incoming TCP packet, CONN_TCPIP would pass the data on to a START_PROGRAM within CONN_TCPIP called HTTP_SERVER along with some parameters. For a simplest task of getting an HTML file and sending it, HTTP_SERVER would make a DOS call to put the file in hard disk cache and return control to CONN_TCPIP. CONN_TCPIP in turn would send this data out. References for TCP/IP and HTML/HTTP are:

http://www.interNIC.net/ds/RFC791,793,1332,1548 for TCP,IP,PPP.

http://www.hp.co.uk/people/dsr/html3 for HTML.

http://www.ics.uci.edu/pub/ietf/http/draft-ietf-http-v10-spec-03.html for HTTP.

CaTbox thus helps a user establish a presence in voice, fax and multimedia data. The greeting of the answering machine is the voice presence. A faxback delivery capability is a fax presence. A World Wide Web HTML pages delivery capability is a multimedia data presence.

I claim:

1. A second computer comprising an operating system, a plurality of hard disks and means whereby said hard disks are recognized by said operating system at said second computer, a SCSI cable whereby said second computer is connected to a first computer, a first programming means at said second computer whereby said second computer in SCSI target mode and said first computer in SCSI initiator mode communicate utilizing a SCSI protocol and said first programming means at said second computer operates said second computer's SCSI node in either target or initiator mode, a second programming means at said second computer whereby an operating system at said first computer recognizes said hard disks of said second computer as SCSI hard disks of said first computer, said second programming means at said second computer, a third programming means at said second computer, and a first programming means at said first computer, utilizing two SCSI logical unit numbers at said second computer whereby a function call to a would be terminate and stay resident program at said first computer by an application program at said first computer is first translated into a SCSI write command to said second computer where said SCSI write command is decoded into a function call to a terminate and stay resident program at said second computer in a way that would not interfere with local accesses to said hard disks at said second computer, followed by a SCSI read command to said second computer where said SCSI read command is decoded to read the results of said function call at said second computer whereby said results are delivered back to said function call at said first computer whereby said application program receives said results.

2. A second computer comprising an operating system, a plurality of hard disks and means whereby said hard disks are recognized by said operating system at said second computer, a SCSI cable whereby said second computer is connected to a first computer, a first programming means at said second computer whereby said second computer in SCSI target mode and said first computer in SCSI initiator mode communicate utilizing a SCSI protocol and said first programming means at said second computer operates said second computer's SCSI node in either target or initiator mode, a second programming means at said second computer whereby an operating system at said first computer recognizes said hard disks of said second computer as SCSI hard disks of said first computer, said second programming means at said second computer, a third programming means at said second computer, and a first programming means at said first computer, utilizing a first SCSI logical unit number at said second computer whereby a call to write contents of a first buffer of data on said first computer to a would be port at said first computer is translated into a SCSI write command to said second computer where said SCSI write command causes a write of contents of said first buffer of data on said first computer to a physical port on said second computer, said second programming means at said second computer, said third programming means at said second computer, and said first programming means at said first computer, utilizing a second SCSI logical unit number at said second computer whereby a call to read data to a second buffer of data on said first computer from said would be port at said first computer is translated into a SCSI read command to said second computer where said SCSI read command causes a read of accumulated data from said physical port on said second computer to said second buffer of data on said first computer.

3. A second computer comprising an operating system, a plurality of hard disks and means whereby said hard disks are recognized by said operating system at said second computer, a SCSI cable whereby said second computer is connected to a first computer, a first programming means at said second computer whereby said second computer in SCSI target mode and said first computer in SCSI initiator mode communicate utilizing a SCSI protocol and said first programming means at said second computer operates said second computer's SCSI node in either target or initiator mode, a second programming means at said second computer whereby an operating system at said first computer recognizes said hard disks of said second computer as SCSI hard disks of said first computer, said second programming means at said second computer, a third programming means at said second computer, and a first programming means at said first computer, utilizing two SCSI logical unit numbers at said second computer whereby reliable access by said operating system at said first computer and by said operating system at said second computer to said hard disks at said second computer is achieved, one of said logical unit numbers providing for data transfers and another one of said logical unit numbers providing for control.

4. The arrangement of two computers in accordance with claim 3 wherein:

said second computer comprises a multiplicity of modems, said second computer comprises a programming system means, said programming system means having a step table file for each said modem
each said step table file having a multiplicity of step table entries, a stepper program means that operates during timer tick interrupt and reads one of said step table entries in a memory image of said step table for each said modem to identify an action to call for each said modem, and calls said actions, and keeps calling said actions at each timer tick until each said action is completed in turn, and based on said step table entry and DTMF, keypad inputs and return codes, determines a next one of said step table entries for each said modem, said actions comprising their own version of said stepper whereby said actions can call other said actions in turn, a first one of said actions whereby a request to execute foreground programs residing on said hard disks can be placed in a first queue, a program means that is activated after the end of the timer tick, as conditions permit, that reads said first queue and chooses one of said foreground programs on said first queue to run, a second one of said actions whereby a sequence of said step table entries may terminate in a request to a second queue said second queue having entries wherein each one of said entries points to one of said step table entries, a third one of said actions associated with a beginning one of said step table entries that examines said second queue and finding a request in an entry there jumps to one of said step table entries noted in said second queue entry, said third one of said actions associated with said beginning one of said step table entries that examines an incoming phone call and determines if said phone call is a fax, voice or data call and jumps to one of said step table entries based on said determination, said third one of said actions associated with said beginning one of said step table entries that examines a buffer for said keypad inputs and jumps to one of said step table entries based on said keypad input, whereby, a multiplicity of modems, scanners, printers may be controlled to implement telephony, voice, fax, data applications in a push button driven, user friendly manner, independent of said first computer.

5. The arrangement of two computers in accordance with claim 3 wherein:

said second computer is connected to telecommunications lines, said second computer comprises a fourth programming means whereby multimedia data is received from said telecommunications lines and stored as files on said second computer's said hard disks, and said first computer comprises a second programming means whereby arrival of said files is polled at any time and said files are converted to outputs, recreating said multimedia data at said first computer's output devices, said first computer comprises a third programming means whereby multimedia input is converted to multimedia data and stored as files on said second computer's said hard disks and a message is sent to a fifth programming means on said second computer whereby said fifth programming means at said second computer sends said files out on said telecommunications lines right away or at a later time or as demanded by incoming calls.

6. The arrangement of two computers in accordance with claim 3 wherein:

said second computer is connected to telecommunications lines, said second computer has a push button user interface, said second computer is continuously on and available, said first computer has a graphical user interface with a mouse and keyboard, said first computer is sometimes on and available,
whereby, telecommunications related, routine tasks initiated by manipulating said push button interface are carried out by said second computer,
whereby, said telecommunications related, routine tasks initiated periodically are carried out by said second computer,
whereby, said telecommunications related, routine tasks initiated by signals from said telecommunications lines are carried out by said second computer,
whereby, complex tasks requiring user intervention are carried out by said first computer.

7. The arrangement of two computers in accordance with claim 3 wherein:

said second computer is connected to a scanner, said second computer has a push button user interface, said first computer is connected to said scanner, said first computer has a graphical user interface with a mouse and keyboard, said first computer is sometimes on and available,
whereby, said scanner related, routine tasks initiated by manipulating said push button interface are carried out by said second computer.

8. The arrangement of two computers in accordance with claim 4 wherein:

one of said hard disks on said second computer comprises a configuration file, said configuration file contains a list of said step table file names linking said file names to said modems, new versions of said step table files and said foreground program files may be copied to said hard disks on said second computer by means on said first computer, said configuration file can be edited by an editor in said first computer to reassign said step tables to said modems, whereby behavior of said modems may be customized and new functions added.

9. The arrangement of two computers in accordance with claim 4 wherein:

one of said foreground programs loads a voice file from said hard disks to a cache area of said hard disks that is not available to said operating system on said second computer and to said operating system on said first computer, one of said actions plays said voice file reading said voice file data from said cache area of said hard disks to a memory area of said second computer.

10. The arrangement of two computers in accordance with claim 4 wherein:

one of said actions records voice data writing said voice data from a memory area of said second computer to a cache area of said hard disks that is not available to said operating system on said second computer and to said operating system on said first computer, one of said foreground programs stores said voice data from said cache area of said hard disks to a voice file on said hard disks.

11. An arrangement of two computers wherein:

a second computer is connected to telecommunications lines, said second computer has a push button user interface, said second computer is continuously on and available, said second computer has an operating system, said second computer has a plurality of hard disks and means whereby said hard disks are recognized by said operating system at said second computer, a first computer has a monitor, said first computer has a graphical user interface, said first computer is sometimes on and available, said second computer and said first computer are connected by a cable, said second computer has a programming means and said first computer has a programming means whereby said first computer recognizes said hard disks of said second computer as hard disks of said first computer, whereby, telecommunications related routine tasks initiated by manipulating said push button interface are carried out by said second computer, whereby, said telecommunications related routine tasks initiated periodically are carried out by said second computer, whereby, said telecommunications related routine tasks initiated by signals from said telecommunications lines are carried out by said second computer, whereby, said telecommunications related routine tasks initiated by said first computer are carried out by said second computer, whereby, tasks requiring said monitor of said first computer are supported by said first computer, whereby, complex tasks requiring said graphical user interface of said first computer are carried out by said first computer.

12. The arrangement of two computers in accordance with claim 11 wherein:

said second computer comprises a multiplicity of modems, said second computer comprises a programming system means, said programming system means having a step table file for each said modem each said step table file having a multiplicity of step table entries, a stepper program means that operates during timer tick interrupt and reads one of said step table entries in a memory image of said step table for each said modem to identify an action to call for each said modem, and calls said actions, and keeps calling said actions at each timer tick until each said action is completed in turn, and based on said step table entry and DTMF, keypad inputs and return codes, determines a next one of said step table entries for each said modem, said actions comprising their own version of said stepper whereby said actions can call other said actions in turn, a first one of said actions whereby a request to execute foreground programs residing on said hard disks can be placed in a first queue, a program means that is activated after the end of the timer tick, as conditions permit, that reads said first queue and chooses one of said foreground programs on said first queue to run, a second one of said actions whereby a sequence of said step table entries may terminate in a request to a second queue said second queue having entries wherein each one of said entries points to one of said step table entries, a third one of said actions associated with a beginning one of said step table entries that examines said second queue and finding a request in a said entry there jumps to one of said step table entries noted in said second queue entry, said third one of said actions associated with said beginning one of said step table entries that examines an incoming phone call and determines if said phone call is a fax, voice or data call and jumps to one of said step table entries based on said determination, said third one of said actions associated with said beginning one of said step table entries that examines a buffer for said keypad inputs and jumps to one of said step table entries based on said keypad input, whereby, a multiplicity of modems, scanners, printers may be controlled to implement telephony, voice, fax, data applications in a push button driven, user friendly manner, independent of said first computer.

13. The arrangement of two computers in accordance with claim 11 wherein:

a first component of an application program runs on said first computer, a second component of said application program runs on said second computer, said first component of said application program and said second component of said application program share a directory on said hard disks of said second computer, whereby said first component of said application program may access a first file received by said second component of said application program from said telecommunications lines and deposited on said directory, whereby said second component of said application program may send, over said telecommunications lines, a second file deposited on said directory by said first component of said application program.

14. The arrangement of two computers in accordance with claim 12 wherein:

new said actions may be created, new said step table entries may be created containing said new actions or said previously created actions, new said foreground programs may be created that are called from said first one of said actions within said new step table entries, whereby components of application programs for said second computer may be developed and added to said programming system means at said second computer.

* * * * *